United States Patent [19]

Wirth et al.

[11] Patent Number: 4,655,129

[45] Date of Patent: Apr. 7, 1987

[54] MARKER SLEEVE PROCESSING MACHINE

[75] Inventors: Gary J. Wirth, Milwaukee; Robert F. Behlmer, Whitefish Bay; Steven D. Hoyt, Lake Geneva, all of Wis.

[73] Assignee: W. H. Brady Co., Milwaukee, Wis.

[21] Appl. No.: 787,211

[22] Filed: Oct. 11, 1985

[51] Int. Cl.[4] ........................ B41F 17/00; B23P 19/00

[52] U.S. Cl. ........................................ 101/35; 400/23; 400/70; 29/33 E

[58] Field of Search ...................... 101/4, 35; 29/33 E; 101/72, 78; 400/23, 621, 70

[56] References Cited

U.S. PATENT DOCUMENTS

| | | | |
|---|---|---|---|
| 3,894,731 | 7/1975 | Evans | 101/4 X |
| 4,395,144 | 7/1983 | Adams et al. | 101/35 X |
| 4,574,440 | 3/1986 | Wirth et al. | 29/33 E |

OTHER PUBLICATIONS

Raychem TMS TM Brochure, Raychem Corporation, Menlo Park, Calif., Sep., 1978.

*Primary Examiner*—Clifford D. Crowder
*Attorney, Agent, or Firm*—Quarles & Brady

[57] ABSTRACT

A marker sleeve processig machine (20) for printing a legend (5) on individual marker sleeves (6) from a series (1) of marker sleeves fed through the machine (20). Various functions of the machine (20), such as transport of the web (1), printing of a sleeve (6) and removal of a printed sleeve (6) from the web (1), are correlated and controlled by programmed circuits (201,203). Data to be printed on the marker sleeves (6) can be input digitally, such as with a communication terminal (208) which may be a personal computer. The machine (20) provides a fully integrated apparatus permitting facile processing of a series (1) of blank marker sleeves to printed marker sleeves (6) bearing a legend (5) appropriate for use as identification devices and a convenient interface is provided for the user to enter the legends (5) to be printed on the marker sleeves (6).

10 Claims, 27 Drawing Figures

Microfiche Appendix Included
(58 Microfiche, 1 Pages)

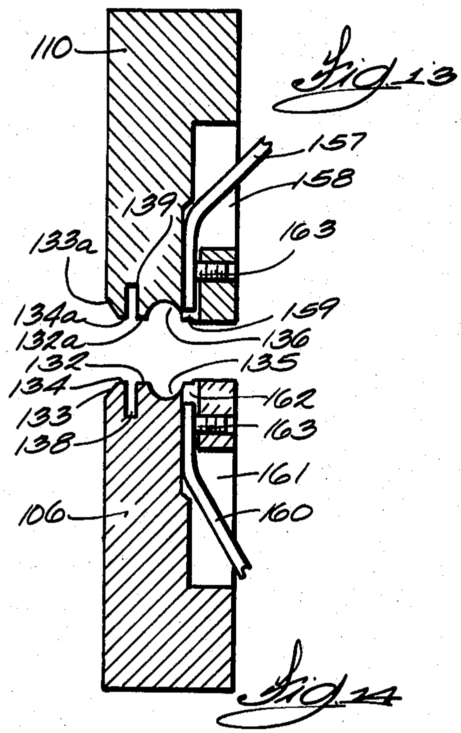
Fig. 13
110
157
158
139
163
133a
134a
159
132a
136
132
135
134
162
133
163
138
161
106
160
Fig. 14
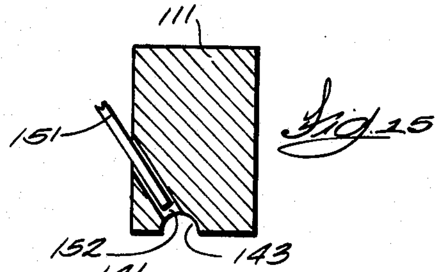
111
Fig. 15
151
152
143
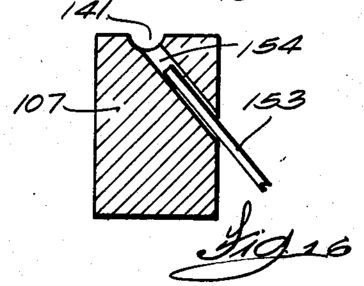
141
154
107
153
Fig. 16
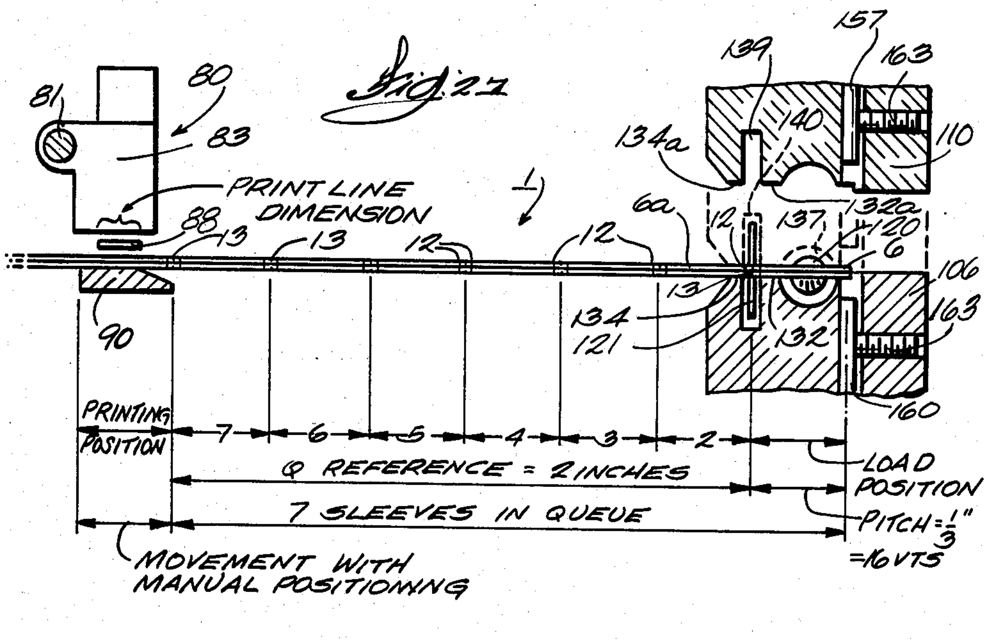
Fig. 27
157
163
139
81
80
83
134a
140
110
PRINT LINE
DIMENSION
1
6a
132a
88
13
13
12
12
12
137
120
6
106
13
134
121
132
163
90
160
PRINTING POSITION
7
6
5
4
3
2
LOAD POSITION
℄ REFERENCE = 2 INCHES
7 SLEEVES IN QUEUE
PITCH = 1/3"
=16 VTS
MOVEMENT WITH
MANUAL POSITIONING

MARKER SLEEVE PROCESSING MACHINE

Microfiche Appendix A with 1 microfiche of 58 frames is incorporated herein.

TECHNICAL FIELD

This invention relates to machines adapted for advancing a web of flat marker sleeves and removing and opening an endmost sleeve from the web so that an operator can apply the sleeve to an article to be identified or otherwise remove the opened sleeve from the machine.

BACKGROUND

The assignee of this application has recently, within about the last three years, introduced a new marker sleeve construction to the market that is rapidly gaining wide commercial acceptance. The new construction comprises a flat web made of base and top films, such as plastic films, seamed together to define individual marker sleeves separable from the web along the seams. Assemblies of marker sleeves of this type are described in U.S. Pat. No. 4,361,230, "Assembly of Tubular Marker Sleeves", Downing et al, and in U.S. Pat. No. 4,363,401, "Sleeve Marker Assembly", Savagian, both assigned to the assignee of this application. Flat marker sleeves of this type offer a number of significant advantages as compared to the prior art tubular marker sleeves, such as for example those disclosed in U.S. Pat. Nos. 3,894,731 and 4,032,010, both assigned to Raychem, and the new flat marker sleeves have replaced tubular sleeves with some end users even though the tubular sleeves have been long established as the predominant product in this field.

An applicator machine for handling webs of flat marker sleeves was developed to meet the requirements of users who must identify a large number of articles and is described in U.S. patent application Ser. No. 635,340 entitled "Marker Sleeve Applicator Machine", Wirth et al, assigned to the assignee of this application, and now U.S. Pat. No. 4,574,440. The machine of said application provides for feeding a strip of marker sleeves to an application station, removing the endmost sleeve from the strip and opening it while it is retained in position at the application station. The machine operator can then insert a wire through the open sleeve and withdraw the wire from the application station bearing the marker sleeve as an identification device.

The machines of the aforesaid application are useful apparatus permitting the mechanical application of flat marker sleeves onto an article, such as a wire, to be identified. The present invention was developed to provide marker sleeve processing machines having new utilitarian capabilities of significant importance to end users of marker sleeves.

Marker sleeves intended for identification devices will usually have alphanumeric characters printed on them, such as serial numbers for example, so as to mark a specific article with its own unique legend. The current practice is to use marker sleeves with legends already printed on them when they are loaded into the applicator machine.

The printing may be done as a separate operation by those applying the marker sleeves, using some type of printing machine. This requires additional handling of the webs of marker sleeves, which increases the cost of processing the marker sleeves, and in some instances, could contribute to the premature separation of the sleeves from the web. The printing operation also requires the purchase of a suitable printing machine independent of the sleeve applicator machine.

Pre-printed sleeves may also be purchased, but this choice only shifts the printing operation to the sleeve supplier and does not assure that the printing of the sleeves will be more cost-efficient.

There are several drawbacks that persist with either of the above approaches to obtaining printed marker sleeves. First, there is the problem of replacing a sleeve that is inadvertantly mishandled and rendered unusable. To maintain a log of unused numbers in a series is considered inconvenient. Second, each user prefers its own system of serializing the marker sleeves with characters that may already have some meaning in its business, and this feature requires added setup or administrative time, depending on where the printing is accomplished. With pre-printed sleeves there is the additional problem of maintaining an adequate inventory so as to meet varying production requirements.

There were several technical problems to be overcome to improve the printing operation. The first problem was presented by the small programmable controller used for directing the operations of the prior sleeve applicator machine. Such a controller is well suited for sensing the state of single-signal input devices, such as photosensors, and operating single-signal output devices, such as solenoid-actuated valves. However, such a controller has limited input/output communication capability, and cannot be conveniently used to control sophisticated peripheral equipment, such as an electronic printer. User inputs to the prior sleeve applicator were made via a group of control panel switches, which is a typical input interface for a controller, but which is not suitable for entering characters to be printed on the marker sleeves.

There were other problems which militated against developing a processing machine of this invention that includes a marker sleeve printing operation. One of these was devising a system for the controller to position the endmost marker sleeve at the printer. Because the photosensors in the prior sleeve applicator were on the applicator mechanism, the web would not be "seen" at a printhead positioned at some distance from the applicator station. Another was to ascertain whether the sleeves should be printed in batches or one at a time. Yet another was the manner in which printing should be sequenced with the application of the marker sleeves. These problems and others were resolved by the invention.

SUMMARY OF THE INVENTION

The present invention resides in an electronically controlled apparatus that integrates an electronic printer in a marker sleeve processing machine.

The electronically controlled apparatus includes a printing station and a sleeve receiving station positioned downstream of the printing station along a feed path. A web feed means advances marker sleeves along the feed path until one of the marker sleeves is moved into a printing position, where it is printed with at least one character, and is thereafter advanced from the printing station to the sleeve receiving station. A user interface is provided to enable the user to designate the character to be printed on the marker sleeve.

The electronic control of the apparatus is provided by a programmed microcomputer which reads the character designated through the user interface and directs printing of the character on the marker sleeve. After printing of the character on the marker sleeve, the microcomputer causes the web feed means to advance the printed marker sleeve to the sleeve receiving station. After the advance of the printed marker sleeve to the sleeve receiving station, the microcomputer directs the station to prepare the printed marker sleeve for removal from the machine.

The invention resolves the technical problems noted above relating to incorporating a microcomputer in a machine for processing marker sleeves for controlling an electronic print means and operation of mechanical elements, positioning an endmost marker sleeve at a printing position, the appropriate manner in which to print marker sleeves, and providing proper sequencing of printing of marker sleeves and removal of printed marker sleeves from the machine. The inventive solutions to these problems are set forth in detail in the ensuing description.

DESCRIPTION OF THE DRAWINGS

An exemplary machine of this invention is described below by reference to the accompanying drawings and appendix which form a part hereof in complete detail to enable those skilled in the art to practice the invention and to set forth our presently-contemplated best modes for its practice. In the drawings:

FIG. 14 is a cross-sectional view of a lower jaw element of the sleeve receiving station;

FIG. 15 is a cross-sectional view of an upper nosepiece element;

FIG. 16 is a cross-sectional view of a lower nosepiece element;

FIG. 19 is a side view of a web guide element of the machine.

FIG. 21 is a block diagram of the system controller board of FIG. 20;

FIG. 27 is a detail view of the area of the machine along the web feed path from the printing station to the sleeve receiving station of the machine.

DESCRIPTION OF BEST MODES FOR CARRYING OUT THE INVENTION

The following detailed description is subdivided into several parts to better clarify the mechanical and electronic elements of a marker sleeve processing machine of this invention.

(1) Schematic of Machine Operation; Marker Sleeve Description

Figure 1:
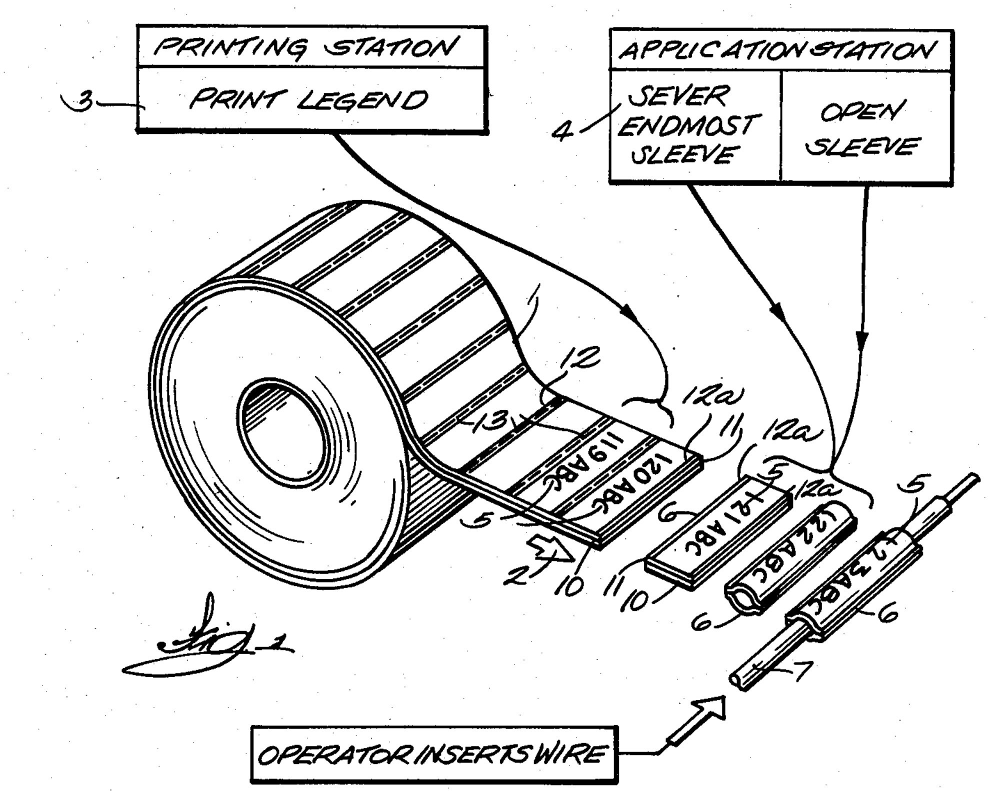
FIG. 1 is a schematic representation of the main operations to be performed on a web of marker sleeves with a machine of the present invention.

FIG. 1 is a schematic representation of the operations to be carried out by the exemplary machine of the present invention to be described hereinafter. A supply roll of web 1 of marker sleeves is to be advanced along a feed path indicated by the arrow 2 past a printing station 3 and thence to a sleeve receiving station illustrated as an application station 4. At the printing station, a legend 5 is to be printed on a marker sleeve 6. The application station is adapted to sever the end sleeve 6 from the web 1 and open the sleeve. While the sleeve is retained in an open condition in the application station, the operator can insert a wire 7 through the open sleeve and then withdraw the sleeve from the machine with the marker sleeve in place on the wire as an identification device.

The web 1 comprises a base film 10 and top film 11 joined together along transverse seams 12 to define a plurality of open-ended tubular marker sleeve 6. Each seam 12 includes a medial severance line 13, such as a row of perforations or slits, along which an individual sleeve can be detached from the web. Thus, a portion 12*a* of a seam 12 forms each closed side edge of a marker sleeve. Both the base and top films can be of the same width as illustrated in FIG. 1, or the top film 11 can be slightly narrower than the base film 10 to provide a small tab along each open end of the sleeve which is useful to facilitate opening the sleeve for insertion onto an article.

The films 10 and 11 are flexible sheet material, most generally flexible thermoplastic films such as polyester films, acrylate films, vinyl films, nylon films and polyolefin films. Paper films, particularly paper coated with a sealable material that would allow formation of the seams 12 can also be used in some instances. The base and top films may be of the same or dissimilar materials. Further, the materials used for the films 10 and 11 can be heatshrinkable films that can be shrunk by means of hot air in a suitable oven for example, so that a marker sleeve 6 can be shrunk so as to tightly conform to the exterior of the wire 7.

At least one of the films 10, 11 is to be printable. The material of the film to be printed should therefore have a composition that can be printed; if the material selected for such film is not inherently printable, the film should be coated with a coating that will accept printing. Various compositions are known that can be used to form a printable coating on plastic films. An especially useful printable coating for heatshrinkable plastic films is described in U.S. Pat. No. 4,461,793 "Printable Coating for Heatshrinkable Materials", Blok et al, assigned to the assignee of this application.

The spacing between the severance lines 13 of the web defines the width of an individual marker sleeve, this width being referred to as the "pitch" of the marker sleeve. The machine is designed for adjustment to accommodate sleeves of varying widths, for example, sleeves of $\frac{1}{4}$ inch, $\frac{1}{3}$ inch, $\frac{1}{2}$ inch and $\frac{3}{8}$ inch may be printed and applied with the illustrated machine 20.

The specific marker sleeve processing machine described in detail herein to illustrate the principles of the present invention is shown as processing a web 1 of flat marker sleeves 6 connected to one another along seams 12 as described above. However, the web 1 is merely exemplary, and a marker sleeve processing machine according to this invention can be designed for processing other types of constructions of a series of marker sleeves. The marker sleeves may be contiguous with one another in a series such as in the web 1, or the marker sleeves may be in a series in the form of a web with the sleeves separate or spaced from one another. The marker sleeves in a series to be processed by the machine need not be connected to one another and the series may comprise, for example, individual marker sleeves supported on a carrier or transport element by which the sleeves can be fed through the machine. Also, the web 1 is illustrated as comprising an assembly of flat marker sleeves, but a marker sleeve processing machine of this invention can also be used to process marker sleeves that are in tubular or semi-tubular form.

(2) General Description of the Machine

Figure 3:
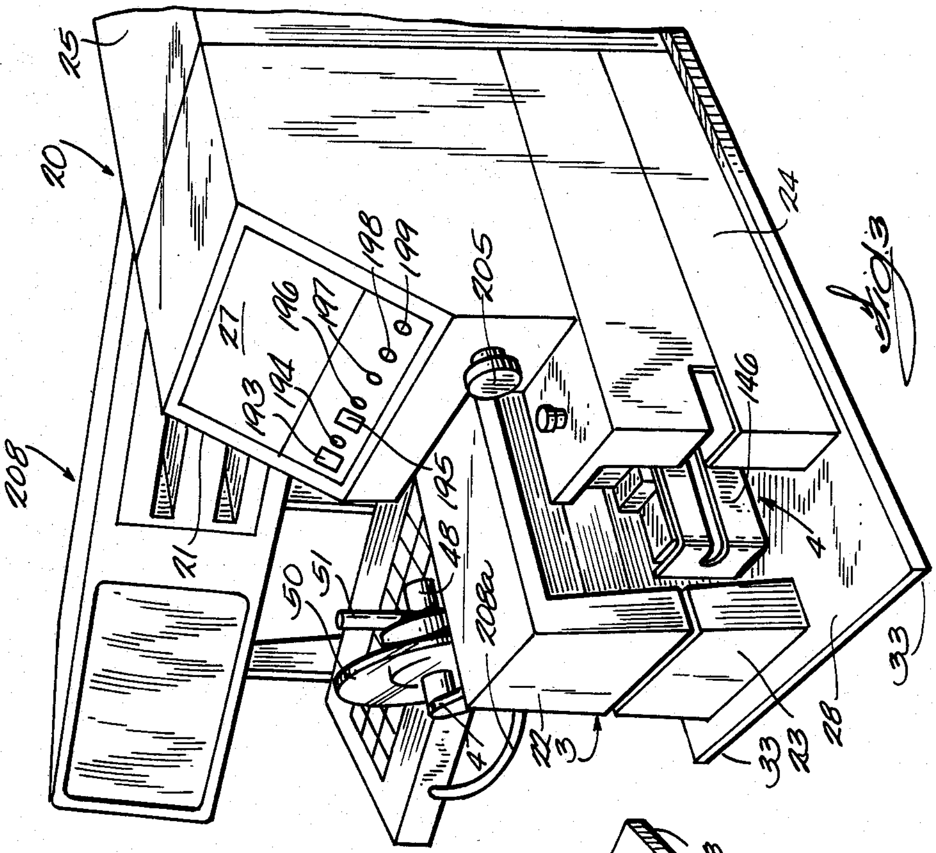
FIG. 3 is a perspective view, with a portion broken away, of the right hand side of the machine.
Figure 2:
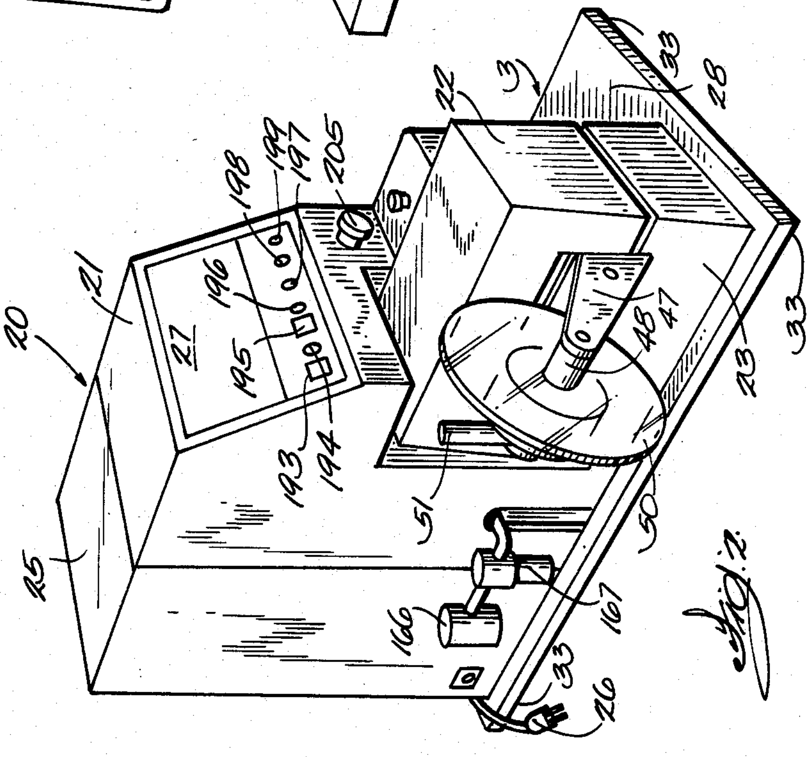
FIG. 2 is a perspective view of the left hand side of a machine of the present invention.

FIGS. 2 and 3 are external views of a specific embodiment of a marker sleeve processing machine 20 of this invention. Mechanical elements of the machine are enclosed by a main cover 21, left upper cover 22, left lower cover 23 and right cover 24 seen in FIGS. 2 and 3. The electronic components of the machine 20 are mounted on circuit boards 200, 201, 202 and 203 (see FIGS. 10 and 17) and located in a rear compartment under the rear cover 25 seen in FIGS. 2 and 3. (If desired for a particular installation, the electronic components may be housed in a module separate from the mechanical elements and connected thereto by appropriate cables.) A power supply cord and plug 26 extends from the rear of the machine 20 as seen in FIG. 2 with the cord being electrically connected to the power supply board 200 of FIG. 10. The other circuit boards include a system controller board 201 and an I/O (input/output) board 202 seen in FIG. 10 and a printer controller board 203 seen in FIG. 17. Also shown in FIGS. 2 and 3 are a manually operable RUN/PAUSE switch 193, a READY light-emitting diode (LED) 194 that lights when the machine is in a ready status, manually operable REPEAT switch 195, LED 196 that lights when a repeated sleeve is being processed, POWER LED 197 that lights when the main power switch for the machine is on, FAULT LED 198 that flashes when a fault condition occurs, and APPLY LED 199 that flashes when a marker sleeve is ready for application to a wire, all of which are located on front panel 27 of the machine. Switches 193 and 195 and LEDs 197–199 are preferably identified by their above legends on the front panel 27, the legends not being shown in the drawings due to space limitations.

Figure 4:
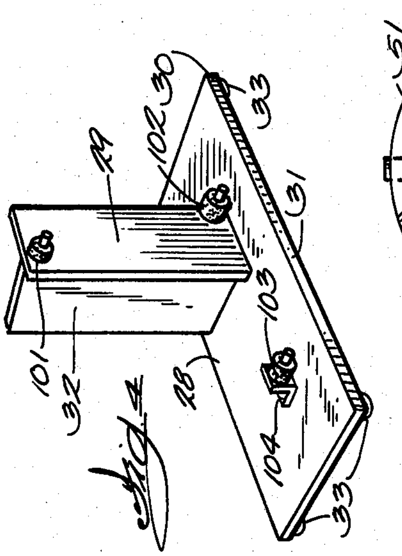
FIG. 4 is a perspective view of the supporting frame structure of the machine.

Turning to FIG. 4, the supporting structure for the various mechanical and electronic components in the machine consists of a base 28; a side wall 29 that is positioned longitudinally along the base and extends from the back edge 30 thereof partway towards the front edge of the base, the side wall 29 being spaced inwardly of side edge 31 of the base; and a rear wall 32 that is joined to the side wall 29 and base 28, the rear wall 32 being spaced inwardly of the rear edge 30 of the base and extending partway across the base in a transverse direction. Cushioned feet 33 are attached near each corner of the base 28 for supporting the machine on a work surface.

Figure 20:
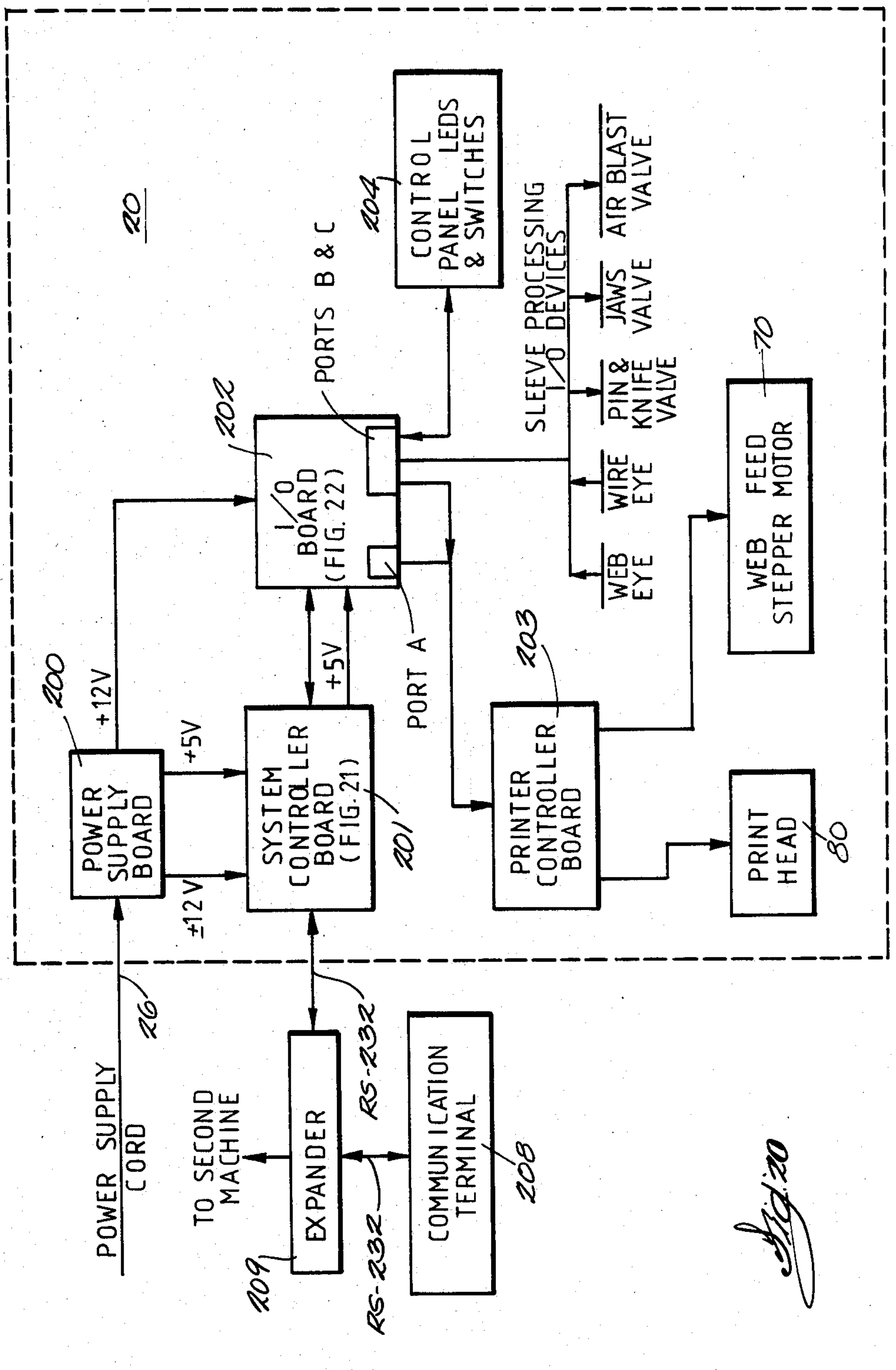
FIG. 20 is a block diagram of the electrical system incorporated in the machine of the present invention and of a user interface that connects to the machine.

Turning next to FIG. 20, the connection of the above—mentioned circuit boards 200–203 is shown. The power supply board 200 is connected to the system controller board 201 and to the I/O board 202 to supply power at the d-c voltage levels used on those boards. The system controller board 201 is also connected to the I/O board 202 through a pair of mating connectors (not shown) on the respective boards. Power at the 5+ volt level is fed first to the system controller board 201 and then through the connectors to the I/O board 202.

The I/O board 202 couples I/O signals in and out of terminals in I/O ports A, B and C. Terminals in I/O Ports A and B are connected to one connector on the printer controller board 203. The printer controller board 203 is also electrically connected to a printhead 80 and to a web feed stepper motor 70. These three subassemblies 203, 70 and 80 are available in the form of a Model 4000 Document Printer from Eaton Corporation, Count Control Systems Division, Watertown, Wis.

The printer subassemblies 203, 70 and 80 have been separated for incorporation in the processing machine 20. For details of the construction and operation of these components 203, 70 and 80, reference is made to the commercial literature available from Eaton Corporation, including a manual entitled "Model 4000 Document Printer and Installation Manual." The invention is not, however, limited to the specific printing apparatus described in this example, and other printing apparatus may be used in other embodiments of the invention. It will also be apparent to those skilled in the art that the physical arrangement of circuit boards 200–203 may take different forms in other embodiments, such as, components being distributed differently on the boards or components being integrated into fewer components and fewer boards.

Terminals in I/O Ports B and C of the I/O board 202 are connected to a group of I/O devices located at application station 4, including two photosensors, referred to as the WEB EYE and the WIRE EYE, and three solenoid-acutated air valves, referred to as the PIN/KNIFE valve, the JAWS valve and the AIR BLAST valve. Other terminals in I/O Ports B and C are connected to the switches and LED's on front panel 27, represented by block 204 in FIG. 20.

Also illustrated in FIG. 3 and represented in FIG. 20 is a communication terminal 208, shown in the form of a personal computer, which acts as a communication terminal for communicating sleeve pitch and other information related to the printing of the marker sleeves. Communication terminal 208 is connected via cable 208*a* (FIG. 3) to an RS-232C port, not shown, located at the back of the machine 20. The preferred terminal is provided by an IBM PC, an IBM portable PC or an IBM PC XT, equipped with two 5¼" floppy disk drives or a hard disk, and operating with the PC-DOS operating system software level 2.1 or higher. In addition, the communication terminal 208 uses application software stored on a floppy disk that is inserted into one of the floppy disk drives. Application software is based on a suitable, relational data base software package, such as that available under the trade designation dBase III from Ashton-Tate, Culver City, Calif., U.S.A. The application software is used to construct data files of printed legends and to provide menus and prompt messages to the operator to select files, or legends entered by the operator, for printing on marker sleeves.

From the viewpoint of the machine 20, the function of the communication terminal 208 is simply to send and receive ASCII-coded characters. The communication terminal 208 sends ASCII-coded characters designating sleeve pitch and certain modes of operation that are dictated when a small number of sleeves are printed and processed. The legends to be printed on the sleeves are themselves made up of ASCII-coded characters. On the other hand, the machine 20 sends ASCII-coded characters to cause the terminal 208 to display menus and prompt messages to the operator. The particular characters that are used will be apparent from later description herein and from Appendix A, which contains the program for the system controller of the machine 20. While the ASCII-coded characters could themselves be used to signal the operator, the application software displays more sophisticated prompt messages to the operator. The communication terminal 208 does not control the machine 20—rather, the machine 20 operates automatically to reach certain stages in its operation, and then it looks for information that has been received from the terminal 208.

Many well known and less sophisticated user interfaces can be used in other embodiments of the invention. For example, a keyboard and display can be incorporated into the machine 20. And, instead of ASCII-coded characters, other types of signals could be employed between the user interface and the system controller.

As an option, the communication terminal 208 is shown in FIG. 20 connected to one machine 20 through an expander module 209. The terminal 208 connects to a first port on the expander module 208 through an RS-232C serial data link. The expander module 209 has four ports on its opposite side for connection through four cables that complete the serial data link to each of four machines like machine 20. The expander module 209 is controlled by the communication terminal 208 to select one of four machines for communication with the terminal 208. This enables one communication terminal 208 to send print information to multiple machines similar to the machine 20. A suitable expander module 209 is provided by a Model 528 Multipoint Controller available from Bay Technical Associates, Bay St. Louis, Mo., U.S.A.

Having described the general organization of the system, the details of the mechanical elements of the marker sleeve processing machine 20 shall be described next, to be followed by the system operation and then the details of the electrical components.

(3) Sleeve Supply; Web Feed Means

Figure 6:
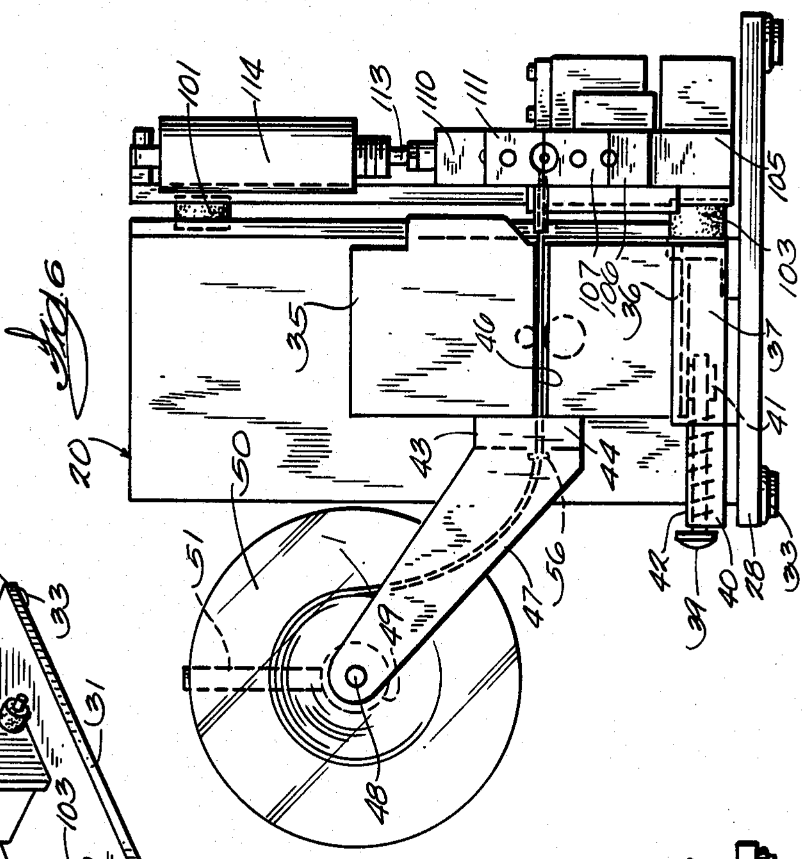
FIG. 6 is a front view of the machine.
Figure 5:
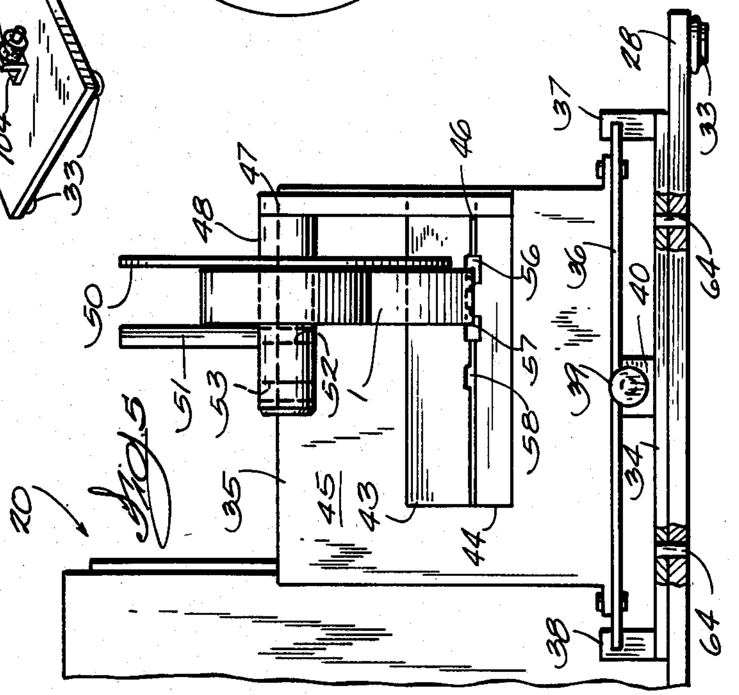
FIG. 5 is a side view of a portion of the machine with the cover removed.

Considering now FIGS. 5 and 6, a rectangular metal frame 35 is attached to a base plate 36. The front edge of the base plate 36 fits in a slotted front slide 37 and the rear edge of base plate 36 fits in a slotted rear slide 38. The slides 37 and 38 are attached to intermediate base plate 34 that is retained on a pair of pins 64 extending from the intermediate base plate 34 into holes in base 28 of the machine. There are several holes in base 28 that can fit the pins 64 so as to allow the frame 35 to be placed at several fore-and-aft positions on the base 28 to accommodate marker sleeves of varying lengths. Manual positioning means is shown as including an adjustment screw 39 threaded through a channel 40 secured to intermediate base plate 34 and through a threaded block 41 secured to the bottom of base plate 36 so as to permit manual adjustment of the frame 35 along slides 37 and 38. The adjustment screw 39 is biased within channel 40 by means of spring 42. These elements provide a means of making adjustments in the position of the print means for reasons to be described later herein.

As best seen in FIG. 5, upper guide block 43 and lower guide block 44 are secured to the left side wall 45 of the frame. The lower edge of guide block 43 is spaced from the upper edge of guide block 44 to define a slot 46 between the two guide blocks. A supply roll arm 47 is secured to guide blocks 43 and 44 near the front of frame 35, see also FIG. 6. A supply roll shaft 48 is attached near the outer end of arm 47, the shaft 48 being non-rotatably attached to the arm 47.

A web 1 of marker sleeves is wound in roll form on a core 49; the core 49 of the roll fits on the supply roll shaft 48 as best seen in FIG. 6. A disk 50, such as of plastic, is secured near the front of shaft 48 to retain the front side of the roll of web 1 in place, and a pin 51 fits into a hole 52 in the shaft 48 to retain the back side of the roll of web 1 in place. The pin 51 can also be placed in hole 53 in a shaft so as to accommodate a roll of a wider web 1.

Figure 7:
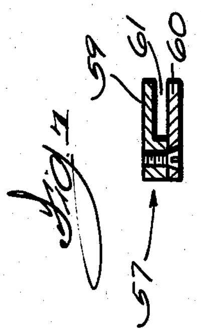
FIG. 7 is a cross-section of an edge guide element.

The web 1 of marker sleeves is led from the roll thereof carried on supply shaft 48 into the slot 46 between the upper and lower guide blocks 43 and 44. In order to guide the longitudinal edges of web 1 into the slot 46, front edge guide 56 and rear edge guide 57 are inserted in notches 58 formed along the lower edge of upper guide block 43 so as to be positioned along the slot 46. One such notch 58 is visible in FIG. 5. Edge guide 57 is shown in cross-section in FIG. 7 and comprises an upper element 59 and a lower element 60 secured to an edge of element 59 but spaced therefrom so as to define a space 61 high enough to accommodate a thickness of a web 1. Edge guide 56 has the same structure. The outer end of lower element 60 of the edge guides is flared to facilitate entrance of the web into the edge guides. There are several notches 58 formed along the lower edge of the guide block 43 so that webs of sleeves of varying length can be accommodated by shifting front and rear edge guides 56 and 57, respectively, to the appropriate notch 58.

Figure 8:
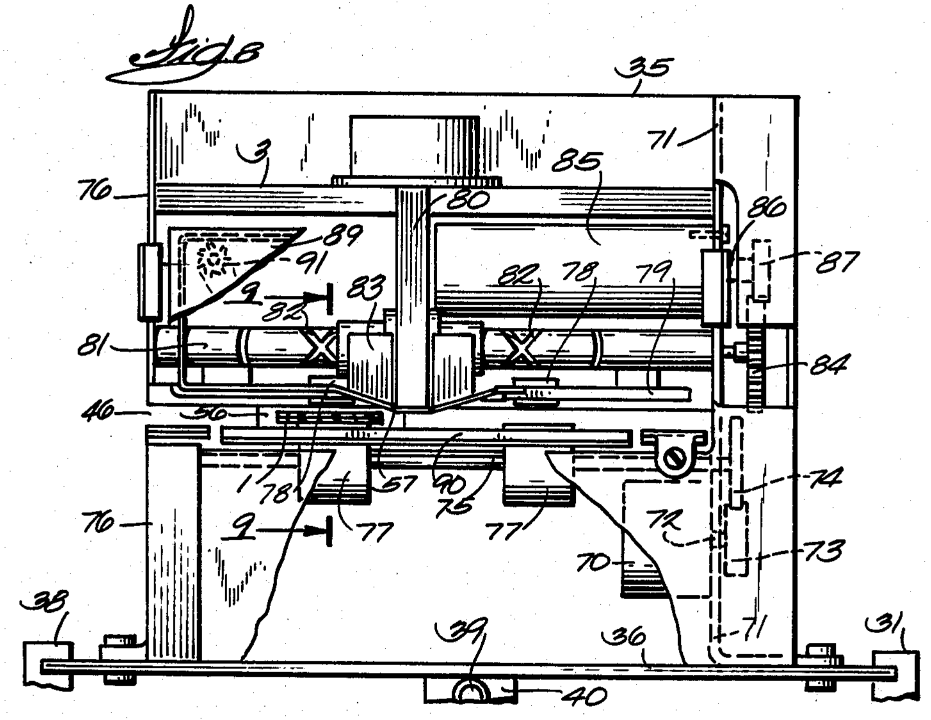
FIG. 8 is a side view, with portions broken away, illustrating the printing station of the machine.
Figure 9:
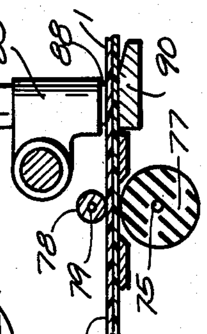
FIG. 9 is a front view showing part of the printing station, with portions broken away.

The illustrative web feed means comprises, turning now to FIGS. 8 and 9, a stepper motor 70 supported on a bracket 71 secured to the frame 35 and having an output shaft 72 carrying an output gear 73. The output gear 73 meshes with a drive gear 74 secured to the end of a feed shaft 75 journaled at its back end in the bracket 71 and at its front end in front wall 76 of the frame 35. The feed shaft 75 carries rubber feed rollers 77; at least one feed roller 77 contacts the web 1 when the stepper motor is actuated to withdraw the web from the roll on the supply roll shaft 48 and advance the web along the feed path through the machine. Idler rollers 78 carried on shaft 79 supported from the frame contact the upper surface of the web 1. The stepper motor can drive the web both forwards and backwards along the feed path; its actuation is controlled by circuit boards 201–203 in FIG. 20 as described in greater detail in parts 6–10 of this description.

(4) Printing Station

The printing station 3 of the machine, referring again to FIG. 8, includes a print means illustrated as comprising a dot matrix printhead 80 that is located in the upper section of frame 35. Other types of print means can be used at the printing station, such as a daisy wheel, thermal printhead, ink jet printer, laser printer, and the like. The printhead is driven bi-directionally along a printhead drive shaft 81 having a continuous helical groove 82 that is engaged by a carriage 83 of the printhead. The printhead drive shaft 81 is journaled along its back end in bracket 71 and along its front end in front wall 76 of the frame 35. The outer back end of drive shaft 81 carries a drive gear 84. A printhead drive motor 85 is attached to bracket 71 and has an output shaft 86 carrying an output gear 87 that meshes with the printhead drive gear 84. Actuation of the printhead drive motor 85 causes the printhead drive shaft 81 to rotate and thereby drive the printhead bi-directionally along the grcove 82 of the drive shaft. Actuation of the motor 85 is also controlled by circuit boards 201–203 in FIG. 20 as described in greater detail in parts 6–10 of this description.

As the web 1 of marker sleeves is advanced through the printing station by the web feed means previously described, advancement of the web is stopped for a short time to allow a legend to be printed on an individual marker sleeve by the printhead 80. An inked ribbon 88, partially shown in FIG. 9, is carried in a cartridge 89 partially shown in FIG. 8 that is supported in the frame 35; the ribbon extends under the printhead and above the web 1. The legend is printed on web 1 as it is positioned above printbar 90. The ribbon is advanced stepwise by actuation of ratchet 91 by mechanism, not shown, also supported on the frame 35.

(5) Sleeve Receiving Station

The application station 4, described herein as one form of sleeve receiving station, is located at the right hand side of the exemplary machine 20 as illustrated in FIGS. 3, 6 and 10–12.

Figure 10:
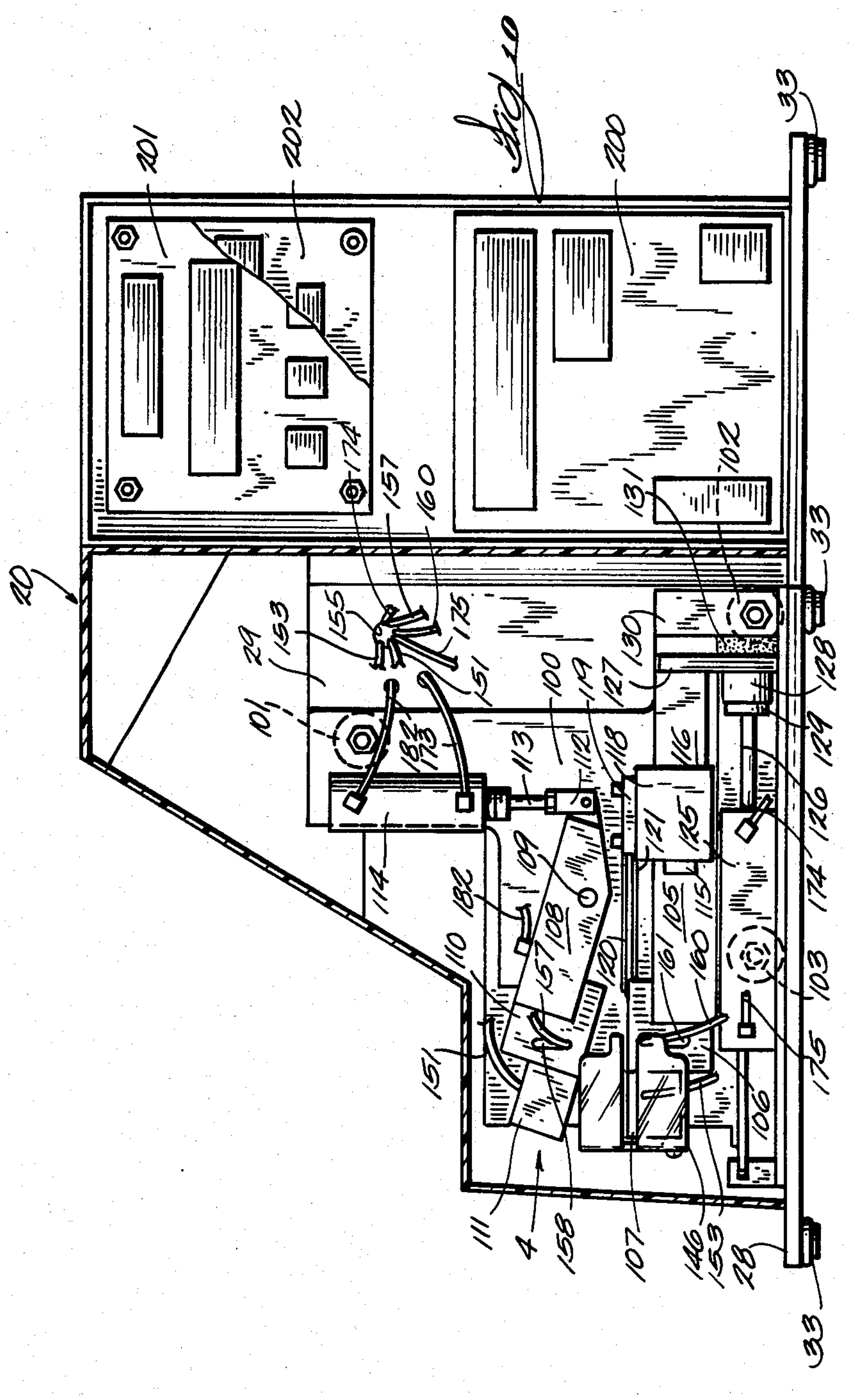
FIG. 10 is a side view illustrating the sleeve receiving station of the machine.

Turning first to FIG. 10, the operating elements of the application station are mounted on a generally L-shaped support plate 100. The rear portion of the support plate 100 is bolted to side wall 29 of the support frame of the machine along two rubber bumpers 101 and 102 (see also FIG. 4) and the lower front portion of the support plate 100 is bolted to a rubber bumper 103 carried on a bracket 104 attached to the base 28. Operation of the elements of the application station can generate mechanical shock forces, and the bumpers 101–103 act to reduce the transmission of the shock forces to the rest of the machine.

Figure 12:
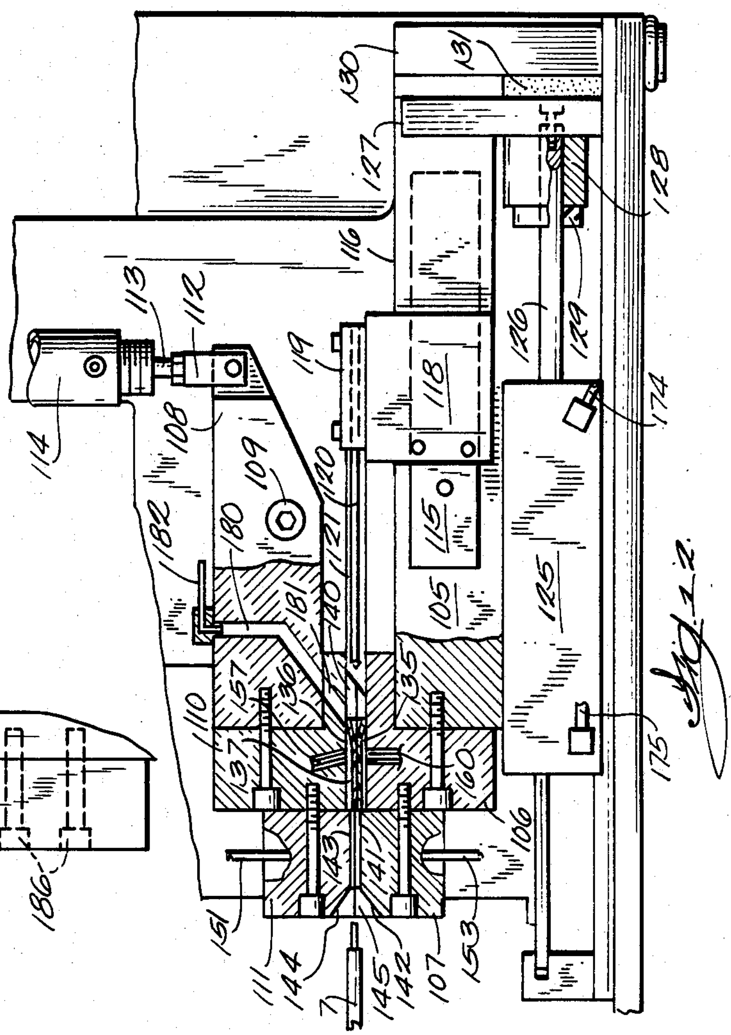
FIG. 12 is a side view, partly in section and with portions broken away, of the sleeve receiving station of the machine.
Figure 11:
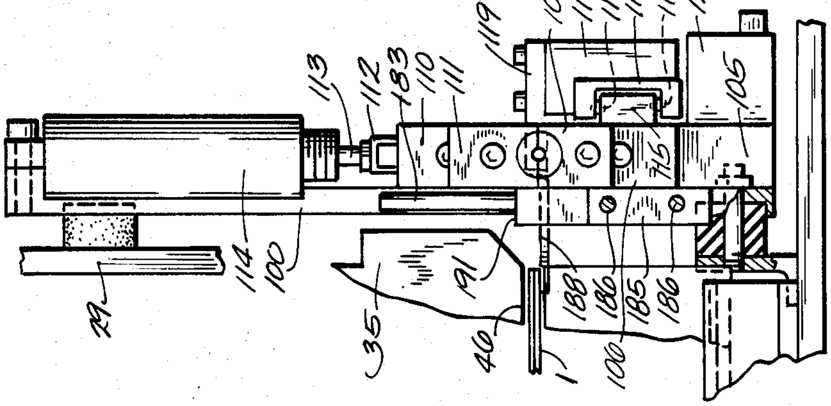
FIG. 11 is a front view, with portions broken away and partly in section, of the sleeve receiving station of the machine.

Considering now FIGS. 10–12, a spacer block 105 is bolted to support plate 100 along the bottom thereof, and a fixed lower jaw 106 is bolted to the front end of the spacer block 105. A lower jaw nosepiece 107 is bolted to the front end of the lower jaw 106. An arm 108 is pivotally mounted on support plate 100 along pivot pin 109. Upper jaw 110 is bolted to the front end of arm 108, and upper jaw nosepiece 111 is bolted to the front end of the upper jaw. The inboard end of arm 108 is connected through clevis 112 to the shaft 113 of a double-acting pneumatic cylinder 114 that is attached at its upper end to the support plate 100. Downward movement of shaft 113 of the pneumatic cylinder pivots upper jaw 110 to a raised or open position shown in FIG. 10, and upward movement of the shaft 113 pivots upper jaw 110 to a lowered or closed position that is illustrated in FIGS. 6, 11 and 12

A linear ball slide track 115 is attached to the outer surface of spacer block 105, i.e. the side opposite from support 100. A U-shaped slider 116 is supported on ball bearings 117 that ride along the track 115. A block 118 is bolted to the slider 116. Crossblock 119 is bolted to the top of block 118 and extends towards support plate 100. The inner portion of crossblock 119 carries a pin 120 that extends towards fixed lower jaw 106 and a cut-off knife 121 positioned inboard of the pin 120 that also extends towards the lower jaw 106.

A double-acting pneumatic cylinder 125 is attached along the bottom of spacer block 105 and includes a shaft 126 that extends towards the rear of the machine. Connector bar 127 is secured to the end of the shaft 126 and extends upwardly and is joined to slider 116. Reciprocation of the double-acting pneumatic cylinder 125 will thereby cause reciprocation of the slider 116 together with the pin 120 and knife 121 supported from the crossblock 119 attached to the slider. An interchangeable stop 128 is carried on the shaft 126 to thereby control the length of the linear movement of the knife and the pin. Cushion washer 129 is also carried on the shaft 126 between the block 128 and the cylinder 125. A stop 130 is secured to spacer block 105 and supports a cushion 131 to dampen the force generated when the connector bar 127 contacts it at the rearmost portion of its stroke.

Figure 13:
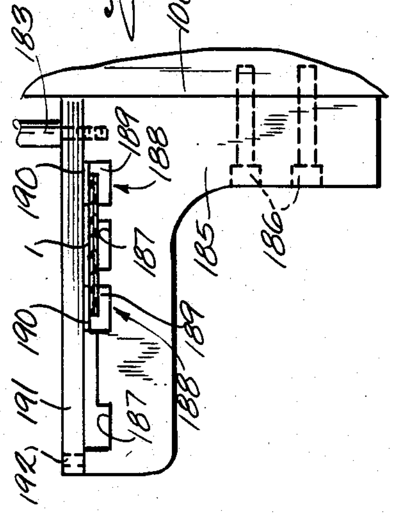
FIG. 13 is a cross-sectional view of an upper jaw element of the sleeve receiving station.

The upper surface of lower jaw 106 has a longitudinal semi-circular groove 135, shown in longitudinal section in FIG. 12 and in cross section in FIG. 14. Similarly, the lower surface of pivotal upper jaw 110 includes a longitudinal groove 136, illustrated in longitudinal section in FIG. 12 and in cross section in FIG. 13. When the upper jaw 110 is in its lowered position, the grooves 135 and 136 combine to define a longitudinal sleeve channel 137 extending along the mating surfaces of the upper and lower jaws. Referring specifically to FIGS. 13 and 14, lower jaw 106 also includes a longitudinal rectangular slot 138 spaced from groove 135 by a land 132 and opening onto its upper surface; upper jaw 110 includes a longitudinal rectangular slot 139 spaced from groove 136 by a land 132*a* and opening onto its lower surface. Slot 138 is spaced inwardly of tapered edge 133 of the lower jaw by land 134, and slot 139 is spaced inwardly of tapered edge 133*a* of the upper jaw by land 134*a*. When the upper jaw is in its lowered position, the slots 138 and 139 mate to form a rectangular channel 140 that is located inboard of the machine relative to the sleeve channel 137. The cut-off knife 121 is to slide within the rectangular channel 140 when pneumatic cylinder 125 drives the knife to its forward position.

The lower jaw nosepiece 107 is shown in longitudinal section in FIG. 12 and in cross section in FIG. 16. The upper surface of nosepiece 107 includes a semi-circular longitudinal groove 141 that is aligned with the groove 135 of the lower jaw 106; as shown in FIG. 12, the outboard end of groove 141 is flared as at 142. Considering now FIGS. 15 and 12, the upper jaw nosepiece 111 has a longitudinal groove 143 that is aligned with groove 136 of the upper jaw; the outboard end of groove 143 is flared as shown at 144. When upper jaw 110 is in its closed position, grooves 141 and 143 in the nosepieces mate to form a longitudinal wire entry channel 145 that is aligned with sleeve channel 137.

During operation of the machine 20, the end marker sleeve of the web 1 is moved along the web feed path until it reaches a position between the lower jaw 106 and the open upper jaw 110. With the end sleeve in a "LOAD" position, the upper jaw 110 is lowered and the end sleeve will extend across sleeve channel 137. A wire 7 (see FIG. 12) is to be inserted through entry channel 145 and thence into sleeve channel 137 to be inserted through an open sleeve held between the closed jaws; the manner in which the sleeve is opened is described below. The flared entrance to channel 145 formed by portions 142 and 144 facilitates the insertion of a wire to be marked with a sleeve through the nosepieces and then into the closed jaws. As best seen in FIGS. 3 and 10, a guard 146, which may be of transparent plastic, can be attached to the lower nosepiece 107 to reduce the likelihood of injury to an operator as the jaws are cycled through their open and closed conditions.

Figure 17:
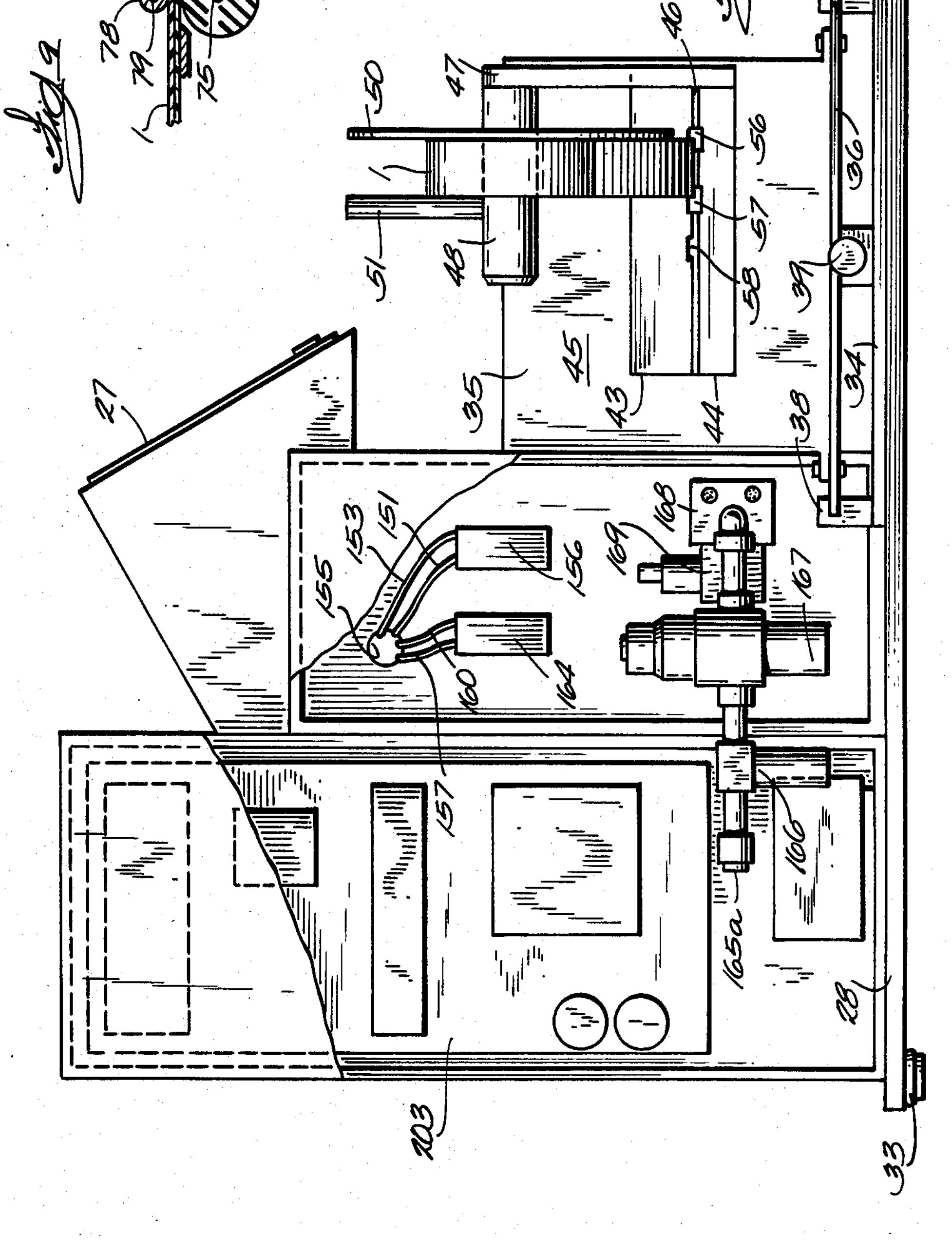
FIG. 17 is a side view of the machine.

Fiber optic element 151 is inserted into bore 152 in upper nosepiece 111 (FIG. 15) and terminates along groove 143. Fiber optic element 153 is inserted into bore 154 in lower nosepiece 107 (FIG. 16) and terminates along groove 141. Optic elements 151 and 153 are held in the respective nosepieces by set screws not shown. Turning to FIG. 10, fiber optic elements 151 and 153 extend from the nosepieces and pass through aperture 155 formed in side wall 29 and are connected to photoelectric sensor 156 attached to the opposite surface of the side wall 29 as shown in FIG. 17. One of the fiber optic elements 151, 153 emits light and the other is positioned to detect the light, provided that the nosepieces 111, 107 of FIG. 15 are closed. When the light beam is uninterrupted, the photoelectric sensor 156 sends a signal at one logic state and when the light beam is interrupted—by a wire 7 inserted between nosepieces 111 and 107 as in FIG. 12—the photoelectric sensor 156 sends a signal of an opposite logic state. The fiber optic elements 151 and 153 and photoelectric sensor 156 constitute, collectively, what is referred to herein as the WIRE EYE sensor.

Considering FIGS. 13 and 14, a fiber optic element 157 is inserted through an angled slot 158 (see also FIG. 12) into bore 159 in the upper jaw 110 to terminate along the rear section of groove 136, and a fiber optic element 160 is inserted through vertical slot 161 and bore 162 in the lower jaw 106 to terminate along the rear section of groove 135. Optic elements 157 and 160 are retained in place by set screws 163 threaded into the respective jaws. Referring to FIG. 10, fiber optic elements 157 and 160 extend through aperture 155 in side wall 29 and are connected to photoelectric sensor 164 attached to the opposite surface of side wall 29 as seen in FIG. 17.

With the jaws closed optic element 157 is angled relative to optic element 160 as shown in FIG. 12. When the upper jaw is opened the optic element 157 will be aligned with optic element 160 as shown in FIG. 10, and the optic elements 157, 160 will then cooperate to send and receive a beam of light outboard of the sleeve channel 137 at a point along the web feed path that is slightly downstream of the grooves 135, 136. When the light beam is uninterrupted the photoelectric sensor 164 sends a signal at one logic state and when the light beam is interrupted—by the advance of the endmost marker sleeve slightly beyond the grooves 135, 136—the photoelectric sensor 164 sends a signal of an opposite logic state. The optic elements 157 and 160 and the photoelectric sensor 164 constitute, collectively, what is referred to herein as the WEB EYE sensor positioned to detect the endmost marker sleeve on the advancing web.

The positioning of an end marker sleeve 6 of the web between the jaws is further illustrated in FIG. 27 in which open position of upper jaw 110 is shown in solid line and the closed position of the upper jaw is shown in dashed line. The first or end marker sleeve 6 is fed between the jaws until severance line 13 connecting it to its adjoining sleeve **6*a* is positioned about in the middle of rectangular channel 140. Lands 132 and 132*a* of the lower jaw 106 and upper jaw 110, respectively, clamp sleeve 6 outboard of severance line 13 and along part of seam 12. The leading edge of sleeve 6 outboard of sleeve channel 137 is not clamped between the jaws. Also, lands 134 and 134*a* of the lower and upper jaws, respectively, clamp the leading edge of second sleeve 6*a* on the opposite side of severance line 13. The leading edge of end sleeve 6 extends across sleeve channel 137 and is shown in its position reached after the light beam between optic elements 157 and 160** of the WEB EYE sensor has been interrupted (when the jaws were open as described above), which position will initiate certain machine operations as described in detail in part (9).

Figure 18:
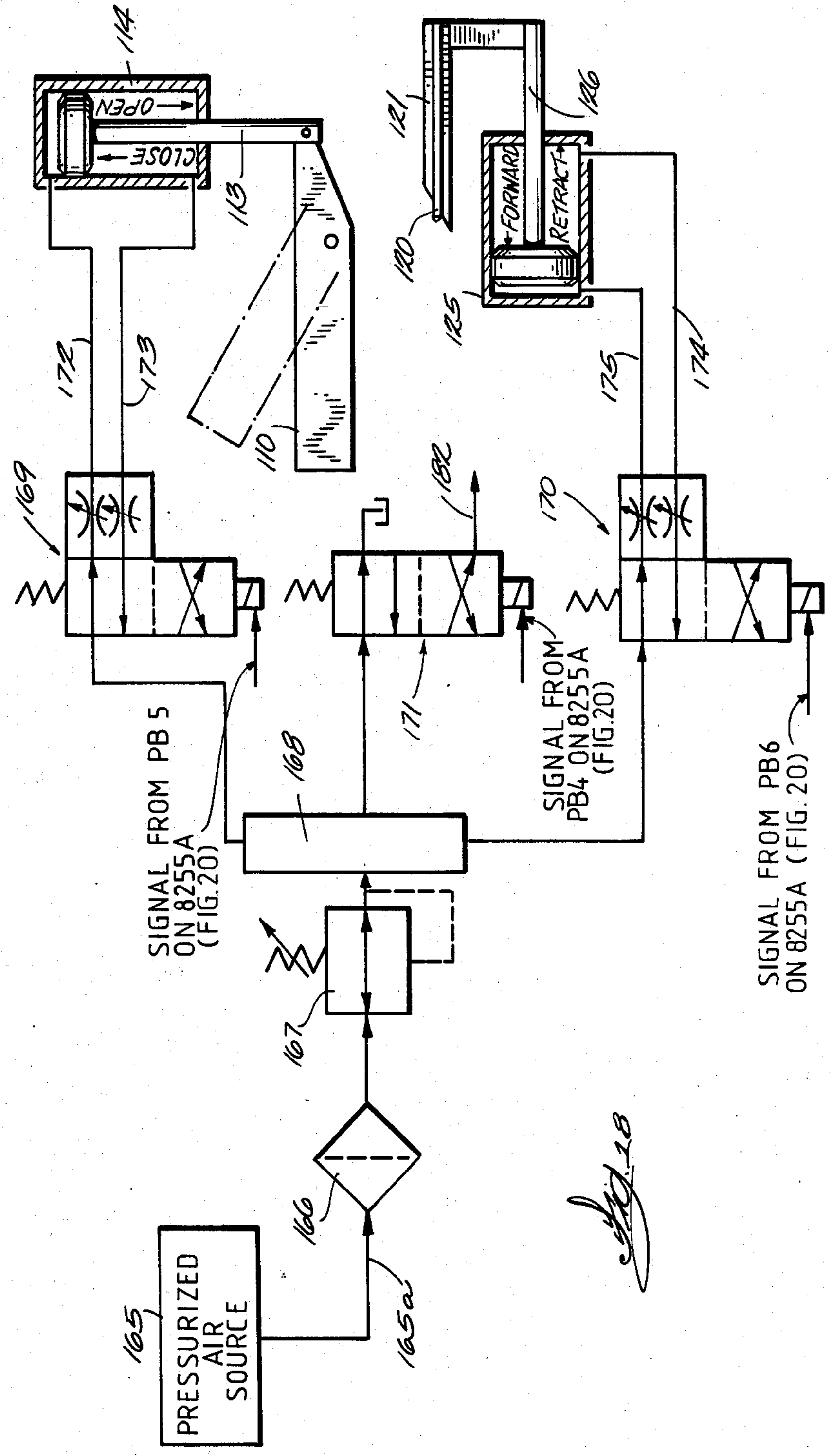
FIG. 18 is a schematic of the pneumatic system incorporated in the machine of the present invention.

The pneumatic apparatus for operating the air cylinders 114, 125 seen previously in FIG. 10 is illustrated in FIGS. 17 and 18. Pressurized air from a suitable source, hidden from view in FIG. 17 and represented generally by block 165 in FIG. 18, is supplied through a tube **165*a* and passes through a filter 166 and pressure regulator 167 into manifold 168. From there, the air is distributed to three pneumatic valves 169–171. Valve 169 is seen in FIG. 17 with the other two valves 170, 171** being hidden from view.

As represented in FIG. 18, the three valves 169–171 are solenoid-actuated, multiple port, four-way, two-position spool valves with spring return. For example, valve 169 is the JAWS valve that controls the air cylinder 114 for moving the upper jaw 110 to open and close. The JAWS valve 169 is provided with two adjustable orifices to control the speed of operation of the cylinder 114. The valve 169 is seen in its return position where air from manifold 168 is routed through one adjustable orifice and through line 172 to cylinder 114 where it enters the cylinder to act on the top side of the piston. With the valve 169 in this position, air is exhausted from the cylinder 114 on the other side of the piston, passing through line 173, the second adjustable orifice and an exhaust port in valve 169. This will cause shaft 113 to move downward to pivot upper jaw 110 to its open position of FIG. 10.

When the solenoid on valve 169 is energized by a signal from circuitry in FIG. 20, the valve spool will move upward against the return spring represented in FIG. 18. This moves the crisscross pair of passageways in between the ports of the valve 169, so that now pressurized air from manifold 168 will be conveyed through line 173 to the lower port on the cylinder 114. This air will act on the underside of the piston to move shaft 113 upward and pivot the jaw 110 to its closed position of FIG. 12. On the top side of the piston, air will be exhausted through line 172 and routed to the exhaust port. When the solenoid is deenergized, then the action of the return spring will cause the valve to move to the position that causes the upper jaw 110 to open again.

Valve 170 is the PIN/KNIFE valve for controlling the air cylinder 125 to move the pin 120 and knife 121 forward, and to later retract the pin 120 and knife 121 when a wire 7 is inserted into an open sleeve. With the valve 170 in its spring return position as seen in FIG. 18, air from distributor manifold 168 is conveyed through an adjustable orifice and line 175 and into the cylinder 125 to act on the top side of the piston. This causes the piston and shaft 126 to move backward to retract the pin and knife. Air on the underside of the piston is conveyed through line 174 and passes through valve 170 to an exhaust port.

Pin 120 and knife 121 are moved forward when a signal from the circuitry in FIG. 20 actuates the solenoid to move the spool upward against the return spring seen in FIG. 18. The crisscross pair of passageways seen in FIG. 18 then connect the manifold 168 and the exhaust port to lines 174 and 175. Pressurized air will be conveyed through line 174 and act on the underside of the piston to move the shaft 126 forward, moving the pin 120 and knife 121 with it. When the solenoid is deenergized, the action of the return spring will cause the valve 170 to move to the position that causes retraction of the pin 120 and knife 121.

AIR BLAST valve 171 is arranged somewhat differently than valves 169 and 170 as only an on/off function is required. One port on the side of the valve 171 opposite the manifold 168 is blocked. When the valve is in its first position seen in FIG. 18 the supply of air to passage 182 is cut off. Passage 182 is connected to a second port opposite the manifold 168 and when the valve passageways are switched by energizing the solenoid to move the spool to its second position (acting against the return spring), the supply of air is connected to passage 182 to provide a stream of pressurized air to the sleeve channel 137.

Air channel 180 (FIG. 12) extends through pivot arm 108 and communicates with air channel 181 that extends through upper jaw 110 to exit along the aft end of sleeve channel 137. Air line 182 is connected to supply air to channel 180 and extends (FIG. 10) through aperture 155 in the side wall 29 and is connected to valve 171 (FIG. 18). A pulse or blast of pressurized air supplied through valve 171 into air line 182 flows through channels 180 and 181 and is directed at the end of a marker sleeve clamped in sleeve channel 137 between closed jaws 106 and 110 to partially open the end of the sleeve, which action is shown in FIG. 12. This facilitates entry of pin 120 into the sleeve so that continued forward movement of the pin as described above can fully open the sleeve.

Advancement of the web 1 of marker sleeves from the printing station to the application station of the machine 20 is aided by edge guides that engage longitudinal edges of the web to guide it into the lower jaw 106. Considering FIG. 11 first, a L-shaped guide support 185 is attached by bolts 186 to the forward edge of support plate 100 to be located alongside the lower jaw 106. The guide support 185 is shown in detail in FIG. 19. The upper leg of support 185, which extends forwardly from support plate 100, has a series of spaced notches 187 formed along its top surface. Edge guides 188 are fit into two of the notches 187, the particular notches being selected to accommodate the length of specific marker sleeves to be fed through the machine. Each edge guide 188 includes a lower element 189 and an upper element 190 spaced apart a sufficient distance to allow a web 1 to pass between the two elements. The edge guides are clamped onto support 185 by a lock plate 191 that extends across the top of the edge guides and is retained in place by pin 192 at its forward end and by a lock screw 183 that is threaded into the support 185 at its aft end. As seen in FIG. 11, the lock screw 183 is long enough to reach to the top of the upper jaw 110 so that a user can readily remove the lock screw and lock plate 191 to move the edge guides into the appropriate notches 187 when changing to sleeves of different length than previously used. Also, the edge guides 188 are long enough to extend from slot 46 in frame 35 to the lower jaw 106.

The lower jaw 106 and upper jaw 110 are bolted to their respective supporting structure so that they can be removed easily and replaced with jaws of other sizes to accommodate marker sleeves of different pitches and/or lengths. The width of the jaws longitudinally of the feed path is selected so that the distance from the center of rectangular channel 140 to the light beam between optics 157 and 160 is equal to or just slightly less than the pitch of a particular sleeve. Similarly, the length of the lower and upper jaws 106 and 110, respectively, transversely of the feed path is selected relative to the length of a marker sleeve such that the jaws will form a sleeve channel 137 long enough to accommodate a particular length of marker sleeve. In addition, if the machine 20 has been set up with jaws to accommodate a marker sleeve of a selected pitch and the operator desires to change to a sleeve of a different pitch, the crossblock 119 and the pin 120 carried thereby are changed so that the pin will be properly sized and positioned relative to the sleeve channel 137 when the jaws are changed for a sleeve of different pitch. As mentioned previously, the interchangeable stop 128 on shaft 126 of air cylinder 125 is changed so that the length of the stroke of the pin and knife when moved forward by the cylinder 125 will be sufficient to extend across a specific length of sleeve markers loaded in the machine 20.

The lower nosepiece 107 and upper nosepiece 111 are each also bolted to the lower and upper jaws, respectively, so that they can be easily removed and replaced to accommodate wires of differing diameters. The entry channel 145 formed between the nosepieces when closed is to be of a diameter appropriate to the diameter of the wire to be inserted therethrough. For this purpose, it has been preferable to provide nosepieces that are sized to accept specific wire diameters, and a machine 20 will include several nosepieces to accommodate users who wish to apply marker sleeves to wires of various diameters.

The sleeve receiving station of the exemplary machine 20 described above comprises an application station 4 including substantially the same elements as described and illustrated in the aforementioned U.S. Pat. No. 4,574,440. The application station 4 as described is particularly adapted for the severance and opening of an endmost sleeve from a web of sleeves and holding an open sleeve in condition for a machine operator to insert a wire into the sleeve and thereafter remove the wire with the sleeve on it from the application station. To achieve this capability, the sleeve receiving station is illustrated as an application station 4 comprising web retaining means (jaws 106 and 110), sensor means responsive to detecting an endmost marker sleeve of the web (optic elements 157, 160 and photoelectric sensor 164), web severance means (knife 121), sleeve opening means (air blast delivered through channel 181 and pin 120), and wire guidance and detection means (nosepieces 107, 111, optic elements 151, 153 and photoelectric sensor 156). While specific elements are described for these several means at the application station 4, it is understood that different elements capable of performing the same or similar operations can be utilized in lieu of the elements described above. For example, the jaws can be replaced with other means for retaining the web, the pneumatic cylinders 114 and 125 can be replaced with hydraulic cylinders or electric motors if so desired, and the optic elements can be replaced with pneumatic proximity sensors or electrical or mechanical means for sensing the presence of a web or wire. Moreover, however, there will be instances in which a user will desire to remove a printed sleeve from a machine of this invention after the sleeve has been printed, severed from the web and opened, and thereafter apply the sleeve to a wire or other article at a different location instead of inserting a wire into the machine as described above. The sleeve receiving station of the machine can be designed to accommodate this alternate capability. A sleeve receiving station for this purpose can include web retaining means, web sensing means, web severance means and sleeve opening means together with mechanical or pneumatic ejector means for removing an opened severed printed marker sleeve from the station. The programming of the electronic section of the machine as described in parts (6)–(10) below can be modified accordingly to provide for this type of action of the sleeve processing machine. In this latter configuration, therefore, the sleeve receiving station can be designed to perform the function of sleeve severance and sleeve opening without the need to insert a wire to be marked through the nosepieces and into the jaws of the machine 20 as described above.

(6) System Controller Board

Referring again to FIG. 20, the system controller board 201 is the "brain" or main controlling subassembly in the sleeve processing machine 20. The basic hardware on this board is available as a SIBEC-51 single board computer from Binary Technology Hanover, Mass., U.S.A. For details of the circuitry and operation of the board reference is made to the commercial literature that is available from Binary Technology. The board is equipped with certain optional connections that can be made with jumpers. The details of this board are seen in FIG. 21, where the primary elements of the board are represented according to their final functional configuration (after the jumper connections have been made).

The primary controlling element on the board 201 is an 8031 microcomputer 210 manufactured by Intel Corporation. This circuit 210 includes an 8-bit microelectronic CPU (central processing unit) and a 128-byte internal RAM (random access memory) 210*c* illustrated in phantom. The input and output terminals on the circuit 210 are organized as four 8-bit I/O ports: Port 0, Port 1, Port 2 and Port 3. The eight terminals in each port are associated by the CPU in binary-coded sets so that the least significant bit in an 8-bit byte is associated with the "0" terminal and the most significant bit in an 8-bit byte is associated with the "7" terminal. Thus, the terminals in I/O Port 2 are designated P20 through P27 in FIG. 21, and the terminals in the other I/O Ports are designated in corresponding fashion. For background information on the architecture, operation and instruction set for the 8031 microcomputer 210, reference is made to the User's Manual and other commercial publications of Intel Corporation describing the 8031 microcomputer 210.

The RS-232C serial data link is connected to the system controller board 201 through a connector represented at the upper left corner of FIG. 21. The connector includes eight pins with the functions shown by the mnemonics appearing in FIG. 21. For example, GND represents a ground potential line. The other functions and their labels are standard designations and RS-232C is a hardware/signal protocol standard in the art. Lines for the individual RS-232C signals other than the GND lines are coupled through a TTL set of level translators 211 oriented in a direction compatible with the directions of the signals indicated in FIG. 21. The six lines other than the GND lines connect to terminals P14–P17 and terminals P30–P31 as shown in FIG. 21. It should be mentioned here that the terminals in the respective Ports 0–3 can function individually or as a group.

The 8031 microcomputer 210 is connected to two external memories 212, 213 through I/O Ports 0 and 2. These include a programmable read-only memory (PROM) 212 and a read/write random access memory (RAM) 213. A Hitachi 2764 erasable programmable read-only memory circuit has been selected as the PROM 212 and has been inserted into the first memory socket on the SIBEC-51 board. The PROM 212 serves as a program memory for storing instructions in the object code form of the language recognized by the 8031 microcomputer 210. The memory 212 has a capacity of 8k bytes of program information. A Hitachi 6216 random access memory circuit has been selected as the RAM 213 and has been inserted in the second memory socket on the SIBEC-51 board. The RAM 213 stores up to 2k bytes data, which in this embodiment is primarily legend data pertaining to the characters to be printed on the marker sleeves.

Particular information is read from particular locations in the memories 212, 213 or is written to a particular location in the RAM 213 by generating thirteen-bit, binary-coded addresses to terminals A0–A12 on respective memories 212, 213. The lower eight bits of address are generated first from outputs P0–P7 and are held in a latch 214 that is activated by an ALE (address latch enable) signal. The upper bits A8–A12 are then transmitted from terminals P20–P24. When the full address has been generated, the 8031 microcomputer 210 uses terminals P0–P7 as data inputs or outputs for information to be read from or written into the memories 212, 213. Thus, these terminals are said to be of the "multiplexed" type and the lines AD0–AD7 connected to terminals P0–P7 constitute a multiplexed bus.

Besides connection to the latch 215, the lines AD0–AD7 in the multiplexed bus connect to data outputs on the PROM 212, data input/output terminals on the RAM 213 and to a bidirectional buffer circuit 216. The buffer 216 boosts the data signals so that the data bus can be extended through a connector to the I/O board 202. The latch 215 supplied with the SIBEC-51 is a 74LS373 8-bit latch manufactured by Texas Instruments, Inc. and the buffer circuit 216 is a 74LS245 8-bit set of two-way, noninverting bus transceivers also manufactured by Texas Instruments, Inc.

One of the memories 212, 213 on the I/O board 202 is selected to receive and recognize address signals according to the state of address signals A13–A15, which are transmitted to a decoder circuit 214. The decoder circuit is a TBP 18S030 Programmable circuit manufactured by Texas Instruments, Inc. Signals A13–A15 are decoded to generate a signal from the "2" output to a chip enable ($\overline{CE}$) input on the PROM 212 or from the "4" output to a chip enable ($\overline{CE}$) input on the RAM 213. Signals A13–A15 can also be decoded to generate a signal from the "9" output on the decoder circuit 214 to the I/O board 202 through a $\overline{MEM}$ $\overline{EXP}$ (memory expansion) line. A signal on this line also activates the buffers 216 at an $\overline{EN}$ (enable) input. When data is to be read from or written to the I/O board 202, address signals are transmitted on lines A0 and A1 to select one of four addressable locations on the I/O board 202.

The result of these connections is that the PROM 212 is addressed within an address range from 0 to 8k, the RAM 213 is addressed in a range of 8k to 10k, and the four ports on the I/O board 202 are addressed at locations 8000, 8001, 8002 and 8003 (hexadecimal numbers), where 8000 (hex) equals 32k.

When program information is to be read from the PROM 212, a control signal is generated from a $\overline{PSEN}$ output on the 8031 microcomputer 210 to an OE (output enable input) on the PROM 212. When data is to be transmitted in either direction between the RAM 213 and the 8031 microcomputer 210, a control signal is generated from the RD (read) output on the 8031 microcomputer 210 to an OE (output enable input) on the RAM 213. When data is to be transmitted in either direction between the buffer 216 and the 8031 microcomputer 210, a control signal is generated from the RD (read) output on the 8031 microcomputer 210 to an DIR (direction control) input on buffer 216. The RD and WR lines and the A0 and A1 address lines are also coupled through a buffer 217 for further transmission to the I/O board 202. The buffer 217 is a 74LS367 hex bus driver manufactured by Texas Instruments, Inc.

Other miscellaneous details shown in FIG. 21 include a representation of the power supply circuit 218 that supplies power to the system controller board 201 and is also fed through to the I/O board 202. Timing signals are provided to inputs X1 and X2 on the 8031 microcomputer 210 by a suitable crystal oscillator 219 for the 8031 microcomputer 210. A reset circuit 220, also of a type suitable for the 8031 microcomputer 210, connects to an RST (reset) input on the 8031 microcomputer 210 and to a terminal to be connected to the I/O board 202.

(7) The I/O Board

Figure 22:
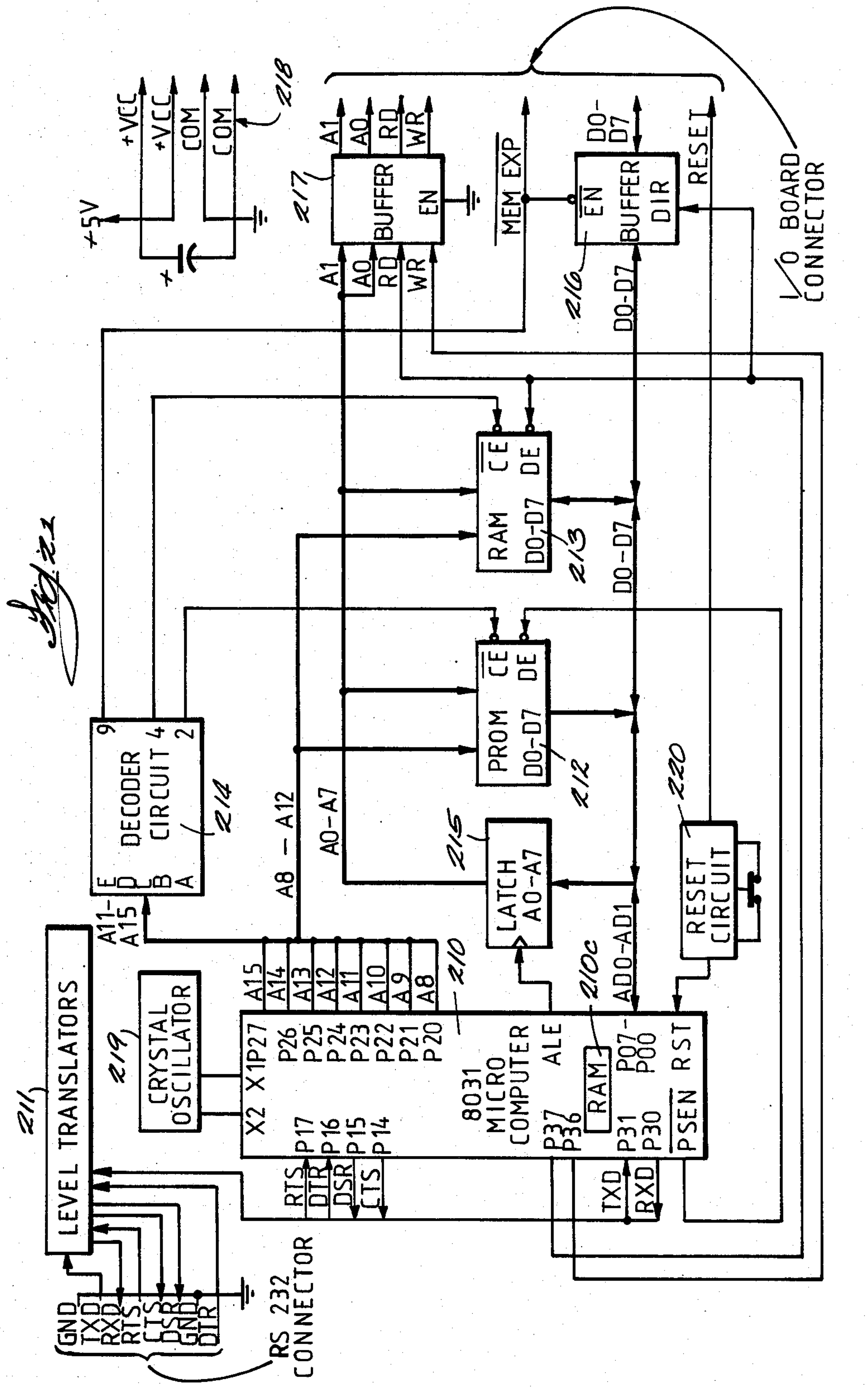
FIG. 22 is a block diagram of the I/O board of FIG. 20.
Figure 22:
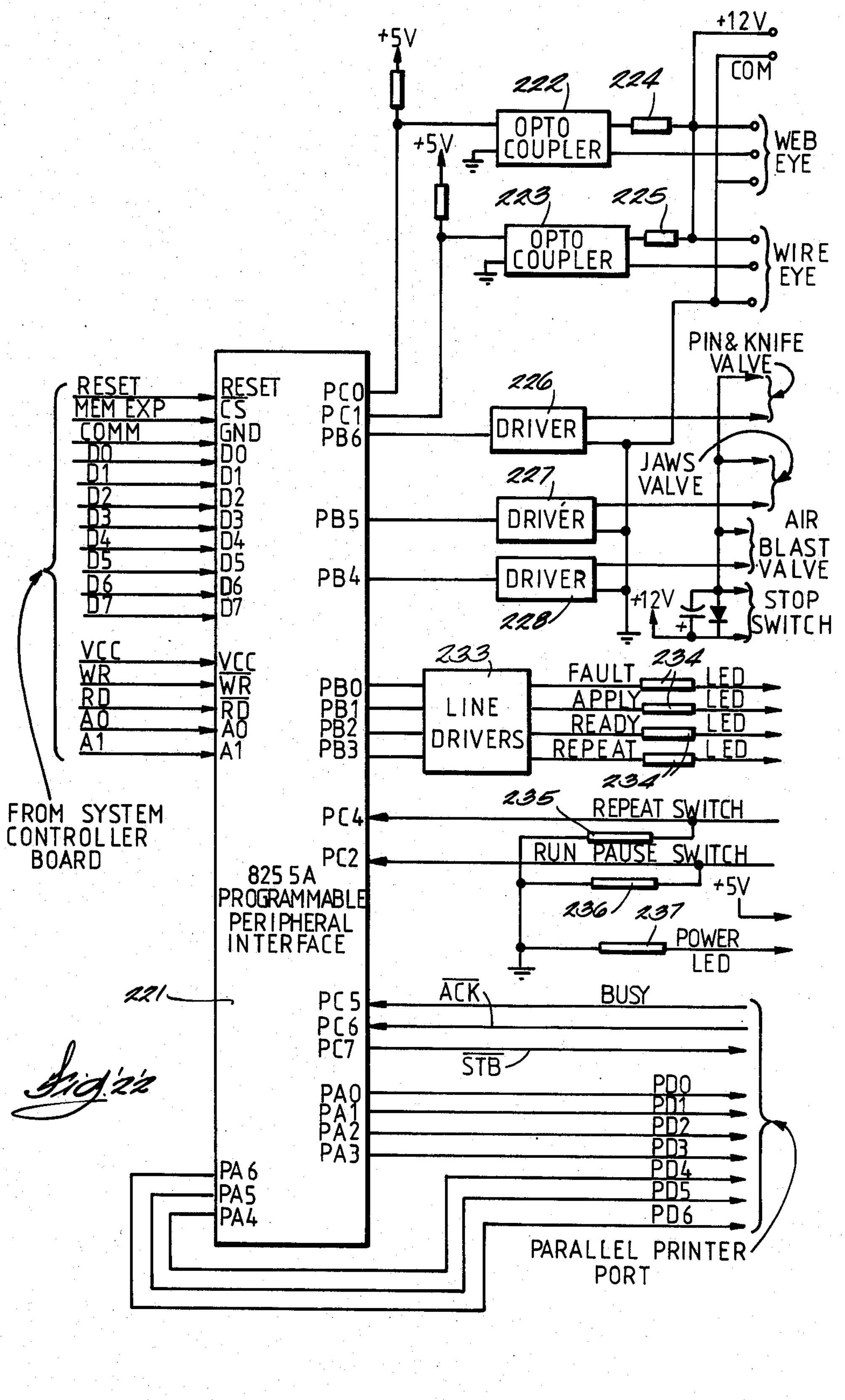

Referring next to FIG. 22, the key element on the I/O board 202 is a Model 8255A programmable peripheral interface circuit 221 available from Intel Corporation. This circuit 221 receives signals from the system controller board 201 through a 40-pin connector (not shown). Not all of the pins are used as it can be seen that there are less than forty signals coupled to inputs on the peripheral interface circuit 221 in FIG. 22. The RESET signal is received at a RESET input, the $\overline{MEM}$ $\overline{EXP}$ signal is received at a $\overline{CS}$ (chip select) input, and a COMM (common or ground) signal is coupled to the GND (ground) input. Eight bits of data D0–D7 are received on eight lines of a data bus that connect to corresponding data inputs. A power signal at +5 volts is designated VCC and is received at a corresponding input on the circuit 221. The $\overline{RD}$ and $\overline{WR}$ signals are received at corresponding inputs and are active in their logic low state as shown by the designations RD and WR. Lastly, the A0 and A1 address signals are received at corresponding inputs to select one of four ports for coupling data or receiving control information.

The four ports of the peripheral interface circuit 221 are designated Port A, Port B, Port C and Control Port. The individual terminals in Ports A, B and C can be programmed with control information to act as inputs or outputs. For the details of programming the I/O Ports, reference is made to the Peripheral Design Handbook from Intel that includes the Model 8255A circuit.

To review the functions controlled by the various inputs and outputs on the peripheral interface circuit 221, please refer first to the top right corner of FIG. 22, where terminals PC0 and PC1 are connected through opto coupler circuits 222 and 223 and resistors 224 and 225 to the WEB EYE and WIRE EYE sensors, respectively. These sensors are supplied with +12 volt power received from the power supply board 200 at the I/O board terminals labeled "+12 V" and "COM" in FIG. 22. The opto coupler circuits 222 and 223 provide electrical isolation and signal level translation between the +5 volt level logic signals at their inputs and the +12 volt level signals used in operating the sensors. The circuits 222 and 223 employed in the preferred embodiment are 4N31 opto coupling circuits manufactured by General Electric Company.

Terminals PB4, PB5 and PB6 are programmed as outputs and connected through Darlington driver circuits 226, 227 and 228 to respective solenoid-actuated PIN/KNIFE, JAWS and AIR BLAST valves. Suitable for driver circuits 226–228 are TIP 122 circuits manufactured by Texas Instruments, Inc. The valve solenoids are supplied with the +12 volt power from the power supply board 200, which is connected to the solenoids through an emergency stop switch 205 shown in FIG. 3.

Terminals PB0, PB1, PB2 and PB3 are programmed as outputs and connected through line drivers 233 and resistors 234 to LED's on the control panel that signal FAULT, APPLY, READY and REPEAT. The line drivers 233 are an 8-bit set of 74LS244 line drivers (four of which are not used) with noninverted outputs manufactured by Texas Instruments, Inc. REPEAT switch 195 is connected to terminal PC4, which is programmed as an input, and RUN/PAUSE switch 193 is connected to terminal PC2, also programmed as an input. These switches are connected to ground through resistors 235 and 236. When acutated to close, the switches provide a current path through the resistors 235 and 236 to produce a voltage drop at the desired logic signal level (+5 volts, for example) at their respective inputs. Whenever the +5 volt power is present a current is supplied to illuminate POWER LED 197 and to return through the resistor 237.

A group of signals seen towards the lower right corner of FIG. 22 are coupled to and from the printer controller board 203 seen previously in FIG. 20. Seven bits of data or control information are coupled on lines PD0–PD7 from terminals PA0–PA6 on the peripheral interface circuit 221. A STB (strobe) signal is transmitted to the printer controller board 203 from terminal PC7 and an ACK (acknowledge signal) is received at terminal PC6. The aforementioned signals are standard signals for communicating with the board 203 supplied with the Eaton Model 4000 Document printer.

The standard Eaton commercial product has been modified in its programming and operation in the following respect. On the standard product a BUSY signal was returned from the printer controller board 203 to signal that a print buffer had reached a full condition. In this embodiment, the BUSY signal is returned to terminal PC5 on the peripheral interface circuit 221. The program for the processor on the printer controller board 203 has now been altered so that the BUSY signal is at a logic high level when the printer controller board 203 has transferred the character from its buffer and recognized it as a character which causes the operation of the web feed stepper motor 70. Such characters include the vertical tab character (<VT>), the carriage return character (<CR>) and a line feed character (<LF>). The BUSY signal returns to a logic low level after the motion has been completed. This allows the system controller to receive confirmation of the positioning of the web.

(8) Definition of the Queue and other Parameters

Referring to FIG. 27, a printing position where a single sleeve is supported under the printhead 80 is a certain distance upstream from the jaws along the web feed path, this distance being a "queue" reference distance and being selected in this instance as two inches from the knife blade 121. The queue reference is flanked in FIG. 27 by the printing position on the left and the sleeve LOAD position along the feed path on the right. Each of these has a dimension equal to the sleeve pitch, which for the example illustrated in FIG. 27 is a sleeve pitch of ⅓ inch. The "queue" itself is capable of containing one sleeve positioned between the jaws 110, 106 and six sleeves in the space between the knife blade 121 and the printing position for a total of seven.

The number of sleeves that are necessary to fill the queue varies with sleeve pitch. Thus, if the sleeve pitch was selected as ¼ inch, a full queue would include one sleeve in the jaws and eight sleeves in the area from the knife 121 to the printing position for a total of nine sleeves in the queue. This assumes that the jaws selected for the applicator station are of a size commensurate with the selected pitch of the sleeves to be printed and applied in the present batch.

The number of sleeves that are required to fill the queue is calculated by the 8031 microcomputer 210 by dividing the queue reference distance, a constant in the program memory, by the sleeve pitch, which is communicated to the 8031 microcomputer 210 from the communication terminal 208 through the serial data link. Taking another example of sleeve pitch, if a pitch of ⅜ inch is selected, the division of the queue reference constant by the sleeve pitch does not result in a whole number of sleeves in the queue. The sixth sleeve would fall short of the printing position by ⅛ inch. In that case the manual positioning means described earlier can be operated to move the printhead and the printing postion ⅛ inch closer to the knife 121 and jaws 110, 106.

Also shown in FIG. 27 is a print line dimension, which is equal to the height of one line of printed material parallel to the feed path. For the Eaton Model 4000 Document Printer, this dimension is approximately ⅛ inch. The web feed stepper motor 70 discussed earlier can advance the web by one print line dimension or by a smaller distance referred to as a "vertical tab," which is equal to 1/48 inch. Thus, there are six vertical tabs to each print line, eight print lines to the inch and forty-eight vertical tabs to the inch. As illustrated in FIG. 27, moving the web by the distance of the sleeve pitch of ⅓ inch means causing the stepper motor 70 to execute 16 vertical tab movements. The stepper motor 70 is driven in response to signals from the printer controller board 203, which in turn are generated in response to characters signaled through the parallel printer port seen in FIG. 22.

(9) General Operation of the Sleeve Processing Machine

To use the marker sleeve processing machine 20, a machine operator first operates an on/off switch (not shown) to apply power which will illuminate the POWER LED 197 on the front panel 27 in FIGS. 2 and 3. Next, the RUN or PAUSE position is selected for the RUN/PAUSE mode selection switch 193—also on the front panel 27. An emergency stop switch 205 is provided just under the front panel that the operator can activate at any time to cut off power to the solenoid actuated air valves of the machine.

The PAUSE mode is selected when it is desired to load one end of the web 1 into the printing position, because the feed roller 77 and idler roller 78 in FIG. 9 will be relegated to their released or unclamped position, allowing the web 1 to be positioned between them. The PAUSE mode can also be selected to stop printing and sleeve applications for operator adjustment of the web 1.

In the RUN mode the feed roller 77 and idler roller 78 grip and feed the web along the web feed path for processing by the machine. In the RUN mode, LED 194 is illuminated as a signal to the operator at the communication terminal 208 that this particular machine 20 is "on line" and ready to receive characters to be printed on marker sleeves.

The system controller board 201 directs five basic functions of the machine 20 involved in printing legends on individual marker sleeves and then rapidly applying the marker sleeves to a series of individual wires. These functions have been designated WEB SET, WEB RESET, PRINT, LOAD, and APPLY.

The WEB SET function involves feeding the web forward along the web feed path, past the printhead 80 and onward to a position between the open jaws of the applicator station 4. The web is moved still further until it interrupts the beam of the WEB EYE sensor, similar to the position shown in FIG. 27 with respect to the LOAD function. It is then backed up in single vertical tab (1/48 inch) steps until it is one vertical tab back of the position interrupting the beam. This completes the WEB SET function.

The WEB RESET function involves retracting the web 1 along the feed path until it is in registration with the area adjacent the printhead that is designated as the printing position. In the example illustrated in FIG. 27, this means feeding the web 1 in the reverse direction along the feed path a distance equal to seven sleeve widths, and then moving one vertical tab length in the forward direction to offset the backup of one vertical tab length in executing the WEB SET function.

The PRINT function begins with a sleeve in the printing position. This may be the eighth sleeve in line as shown in FIG. 27, which shows one mode of operation. In other modes of operation the sleeve in the printing position may be the endmost or leading sleeve of the web 1. In any event, the printhead 80 is positioned so that the ribbon 88 is spaced the proper distance from the leading edge of the sleeve to begin printing of the first line of the legend. This spacing may vary depending on whether the legend includes only one printed line of print or multiple printed lines. Each print line may include a plurality of alphanumeric characters. A print line may also include margin characters that cause the printhead 80 to move laterally along drive shaft 81 until positioned to begin printing visible characters on a sleeve. During printing of the legend, the sleeve is advanced to the last line of the legend by "line feed" or "vertical tab" characters which cause the printer controller board 203 to actuate the stepper motor 70. At the conclusion of printing, the trailing unprinted portion of the sleeve may remain in the printing position until the web is advanced by carrying out another function such as the LOAD function.

The LOAD function for the endmost marker sleeve is carried out after the printing of a legend on the sleeve in the printing position, provided that the queue is full. With the jaws open, see FIG. 27, the web is fed forward one vertical tab length (1/48 inch) at a time and the status of the WEB EYE is checked until the forward edge of the endmost marker sleeve interrupts the beam of the WEB EYE. Then the jaws are closed by energizing the solenoid on the JAWS valve 169. After a time delay, the solenoid on the AIR BLAST valve 171 is energized to provide the air blast that opens the sleeve in the jaws. After another time delay, the solenoid on the PIN/KNIFE valve 170 is energized to move the pin forward into the open sleeve and to move the knife 122 forward to sever the endmost sleeve from the web. After yet another time delay, the AIR BLAST solenoid is de-energized to terminate the air flow to the sleeve. This completes the LOAD FUNCTION.

The APPLY function includes illuminating the APPLY LED 199 to prompt the operator to insert a wire into the open sleeve. Then the WIRE EYE is monitored to detect the insertion of the wire. When a wire is inserted so as to interrupt the beam of the WIRE EYE sensor, the PIN/KNIFE solenoid is de-energized to withdraw the pin 120 from the sleeve and to retract the knife 121. A time delay is observed to allow the pin and knife to be withdrawn to their respective starting positions. The jaws are then opened by de-energizing the solenoid on the JAWS valve 169 and the APPLY LED is turned off. This completes the APPLY function.

The above five functions are executed in different sequence and with several modifications according to the number of sleeves being printed and applied. These modes include a NORMAL mode, a DUMPQ mode, a SINGLE mode and a REPEAT mode. The NORMAL, DUMPQ and SINGLE modes are selected by communicating "escape codes" from the terminal 208 to the system controller board 201 through the serial data links. The REPEAT mode is selected to override the normal execution of the NORMAL mode by operating the REPEAT switch 195 that connects to the peripheral interface circuit 221 as seen in FIG. 22. These modes can best be explained in connection with the execution of the program for the 8031 microcomputer 210 which is discussed below.

(10) Programmed Operation of the 8031 Microcomputer

The sequences of instructions that are executed by the 8031 microcomputer 210 to carry out the functions of the sleeve processing machine 20 are listed in the form of source code in Appendix A. The instructions are stored in the form of object code in the PROM 212 of FIG. 21. Since the instructions in PROM 212 become a part of the system controller board 201 and are not loaded into the machine 20 each time the program is to be executed they are referred to as "firmware" rather than "software".

Figure 23:
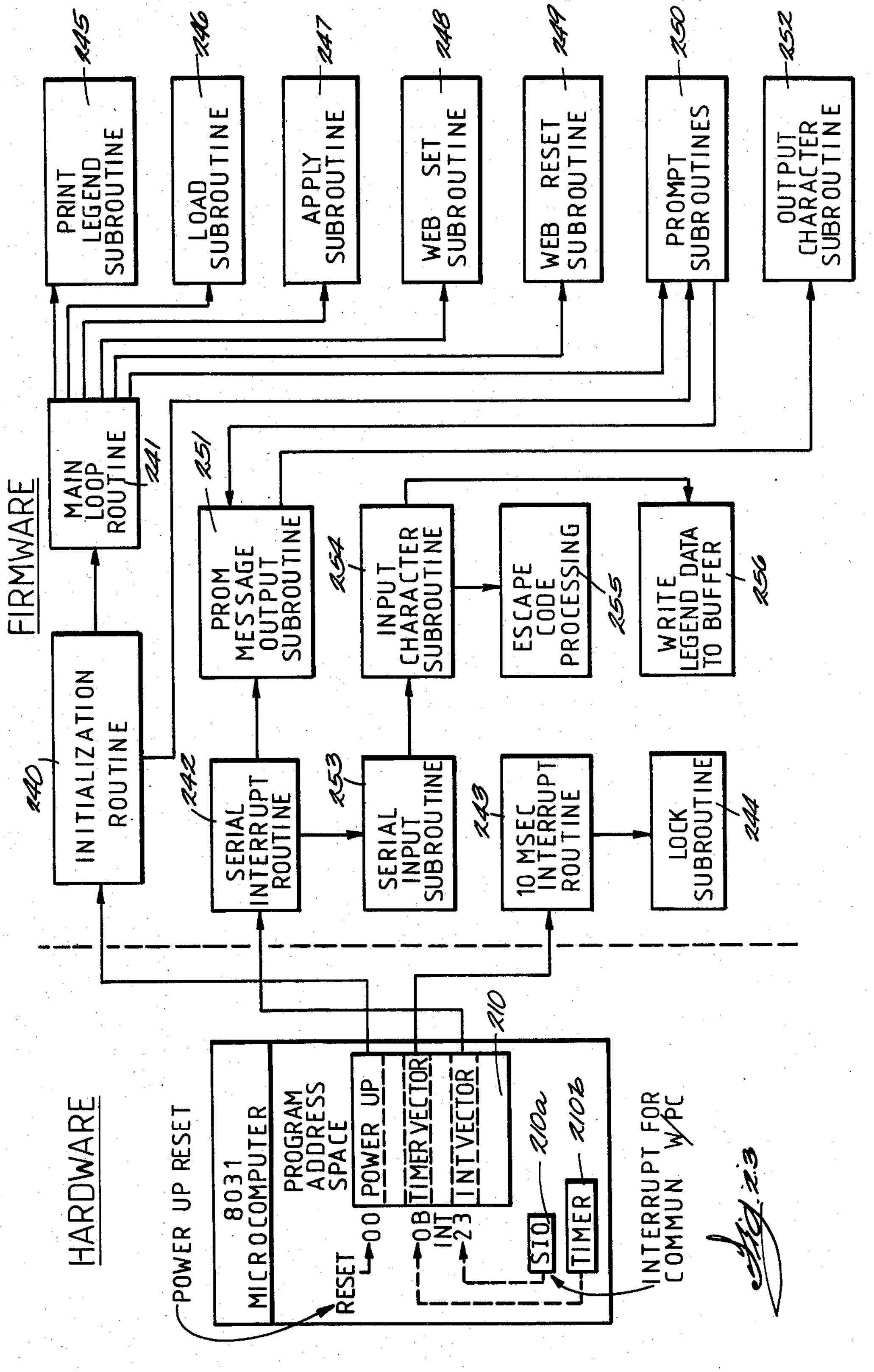
FIG. 23 is a hardware-firmware block diagram representing the operation of the microcomputer of FIG. 21.

The operation of the 8031 microcomputer 210 in executing the program in the PROM 212 is represented in FIG. 23. The program is divided generally into three parts: (1) a MAIN LOOP ROUTINE represented by block 241, preceded on startup by an INITIALIZATION ROUTINE represented by block 240, (2) a SERIAL INTERRUPT ROUTINE represented by block 242 and (3) a 10-MILLISECOND INTERRUPT ROUTINE represented by block 243. A reset address is stored for the INITIALIZATION routine. The address for the beginning of each of the other two main routines is stored as part of an interrupt vector jump instruction in the area of the PROM 212 that is addressed by the microcomputer at locations 00 (hex) to 3F (hex), the first sixty-four addresses of its program address space.

On receiving a reset signal when power is first applied or switched on and off, the 8031 microcomputer 210 will fetch the contents at location 00 (hex) and load it into its program counter to point to 40 (hex) as the next location for reading a program instruction. Thus, it "resets" to location 40 (hex) to begin execution of instructions in the INITIALIZATION ROUTINE represented by block 240.

An interrupt signal is generated by the receipt of transmission of a character when communicating with the communication terminal 208 over the RS-232C communication channel. This signal is generated internally from a serial input/output (SIO) portion 210*a* of the 8031 microcomputer 210 to the CPU portion of the microcomputer 210 to cause execution of a jump instruction at location 23 (hex). Execution of the jump instruction at location 23 (hex) causes the address 01F3 (hex) to be loaded into the program counter. Address 01F3 (hex) is the location of the first instruction in the SERIAL INTERRUPT ROUTINE represented by block 242.

Another internal interrupt signal is generated each 10 milliseconds by a TIMER portion 210*b* of the microcomputer 210. This causes execution of a jump instruction stored at location 0B(hex). Execution of this instruction causes the address 0149 (hex) to be loaded into the program counter. This address is the location of the first instruction in the 10-MILLISECOND INTERRUPT ROUTINE represented by block 243.

Thus, the 8031 microcomputer 210 starts up by executing the INITIALIZATION and MAIN LOOP ROUTINES. It suspends execution of these routines upon receiving either a communication interrupt signal or a timer interrupt signal. Also, if the SERIAL INTERRUPT ROUTINE is being executed when a timer interrupt signal is received, the microcomputer will suspend execution of the SERIAL INTERRUPT ROUTINE 242 to execute the 10-MILLISECOND INTERRUPT ROUTINE 243. After completion of the 10-MILLISECOND INTERRUPT ROUTINE 243, the execution of the SERIAL INTERRUPT ROUTINE 242 will be completed, and then the microcomputer will return to the point of departure in the MAIN LOOP ROUTINE 241.

The 10-MILLISECOND INTERRUPT ROUTINE 243 includes the instructions for reading inputs on the sleeve processing machine 20. Referring briefly to FIG. 22, this includes sensing the status of the WEB EYE and WIRE EYE sensors, the REPEAT switch 195 and the RUN/PAUSE 193 switch, all of which are connected to Port C of the peripheral interface circuit 221. The 10-MILLISECOND INTERRUPT ROUTINE 243 also includes the instructions for changing the state of output devices on the machine 20 such as the PIN/-KNIFE valve 171, the JAWS valve 169, the AIR BLAST valve 170 and the LEDs. These output devices are controlled by writing data to Port B of the peripheral interface circuit 221. Executing these instructions at a predetermined, sufficiently short interval provides the fast update necessary to control an operating machine with a microcomputer.

It should be noted that the program in PROM 212 can be suitably modified if the sleeve receiving station of the machine is to be adapted for removal of printed sleeves without insertion of a wire so that the sleeves can be applied remote from the machine, as previously described.

The 10-MILLISECOND INTERRUPT ROUTINE 243 also contains instructions for a number of miscellaneous functions such as the flashing of certain LEDs every twenty interrupts, checking for faults and interpreting the state of the RUN/PAUSE switch in view of other conditions. In performing this last function it may be necessary to signal the printer controller board 203 to lock or unlock the web feed roller 77. This is accomplished by calling a LOCK SUBROUTINE represented by block 244 which causes an escape code to be transmitted to the printer controller board 203. The printer controller board 203 interprets this code as a command rather than a character to be printed, and the feed roller 77 is operated accordingly.

In addition to the main routines, FIG. 23 also shows some of the more significant subroutines as they relate to the main routines. For example, during execution of the MAIN LOOP ROUTINE 241, various subroutines represented by blocks 245–250 are called and executed. When a subroutine has been executed, the microcomputer 210 returns to the point of departure in the MAIN LOOP ROUTINE 241. The subroutines include the PRINT LEGEND SUBROUTINE 245, the LOAD SUBROUTINE 246, the APPLY SUBROUTINE 247, the WEB SET SUBROUTINE 248, the WEB RESET SUBROUTINE 249 and the PROMPT SUBROUTINE 250. Execution of the PRINT LEGEND SUBROUTINE accomplishes the PRINT function discussed earlier herein. Similarly, execution of the PRINT LEGEND SUBROUTINE accomplishes the PRINT function discussed earlier herein. Similarly execution of the other subroutines accomplishes the function for which they are named, and these functions were discussed earlier herein. In executing these subroutines, still further subroutines may be called and executed and these are listed in Appendix A. For example, the PRINT LEGEND SUBROUTINE calls a PRINT CHARACTER SUBROUTINE labeled "PRNCHR" in Appendix A each time a character in the legend is to be printed.

The SERIAL INTERRUPT ROUTINE 242 also calls a number of subroutines to perform various functions related to serial communication. For example, when communication interrupt is caused by transmission of a character, the microcomputer 210 will call a PROM MESSAGE OUTPUT ROUTINE 251 to load a character from the PROM 212 for transmission to the communication terminal 208.

To explain the purpose of the PROM MESSAGE OUTPUT ROUTINE 251, an example of sending of a prompt character to the communication terminal 208 shall be considered. It shall be assumed that the operator is to be prompted to enter the parameter for sleeve pitch. When the ">" character is sent to the terminal 208, the terminal will display a message to the operator to enter the sleeve pitch as a whole number of vertical tabs, e.g. 16 for a sleeve pitch of ⅓ inch, for processing a first batch of marker sleeves. For subsequent batches, the operator is shown the previously selected sleeve pitch, and is given the opportunity to change it or keep it the same.

To send the prompt character, one of three PROMPT SUBROUTINES 250 is called during the INITIALIZATION ROUTINE 240. In executing the PROMPT SUBROUTINE the microcomputer points to the location in the PROM 212 that stores a constant representing the ASCII code for the ">" character and then calls the PROM MESSAGE OUTPUT ROUTINE 251 to load the character into the SIO portion 210*a* of the microcomputer 210 for transmission to the communication terminal 208. An OUTPUT CHARACTER SUBROUTINE represented by block 252 is called by the PROM MESSAGE OUTPUT ROUTINE 251 to actually load the individual character for transmission. The transmission of this character will generate the interrupt signal that causes the microcomputer 210 to call the PROM MESSAGE OUTPUT ROUTINE 251 a second time—through the SERIAL INTERRUPT ROUTINE 242. The PROM MESSAGE OTUPUT ROUTINE 251 then controls the fetching and transmission of any subsequent characters in the message or data string. However, in this example, there is only one character in the prompt message.

When characters are received from the communication terminal 208, the SERIAL INTERRUPT ROUTINE 242 will call a SERIAL INPUT SUBROUTINE 253 to process and store the characters. This routine calls an INPUT CHARACTER SUBROUTINE represented by block 254 to actually read the character for further processing. Such characters may be part of a printer command which typically includes an "escape" character followed by one or more numerals or letters. Such characters may also be part of a print legend to be printed on a marker sleeve. The characters are recognized as being in one of these two categories during execution of the INPUT CHARACTER SUBROUTINE 254, and accordingly, either the ESCAPE CODE PROCESSING SUBROUTINE represented by block 255 is called, or the WRITE LEGEND DATA TO BUFFER SUBROUTINE represented by block 256 is called.

Figure 24:
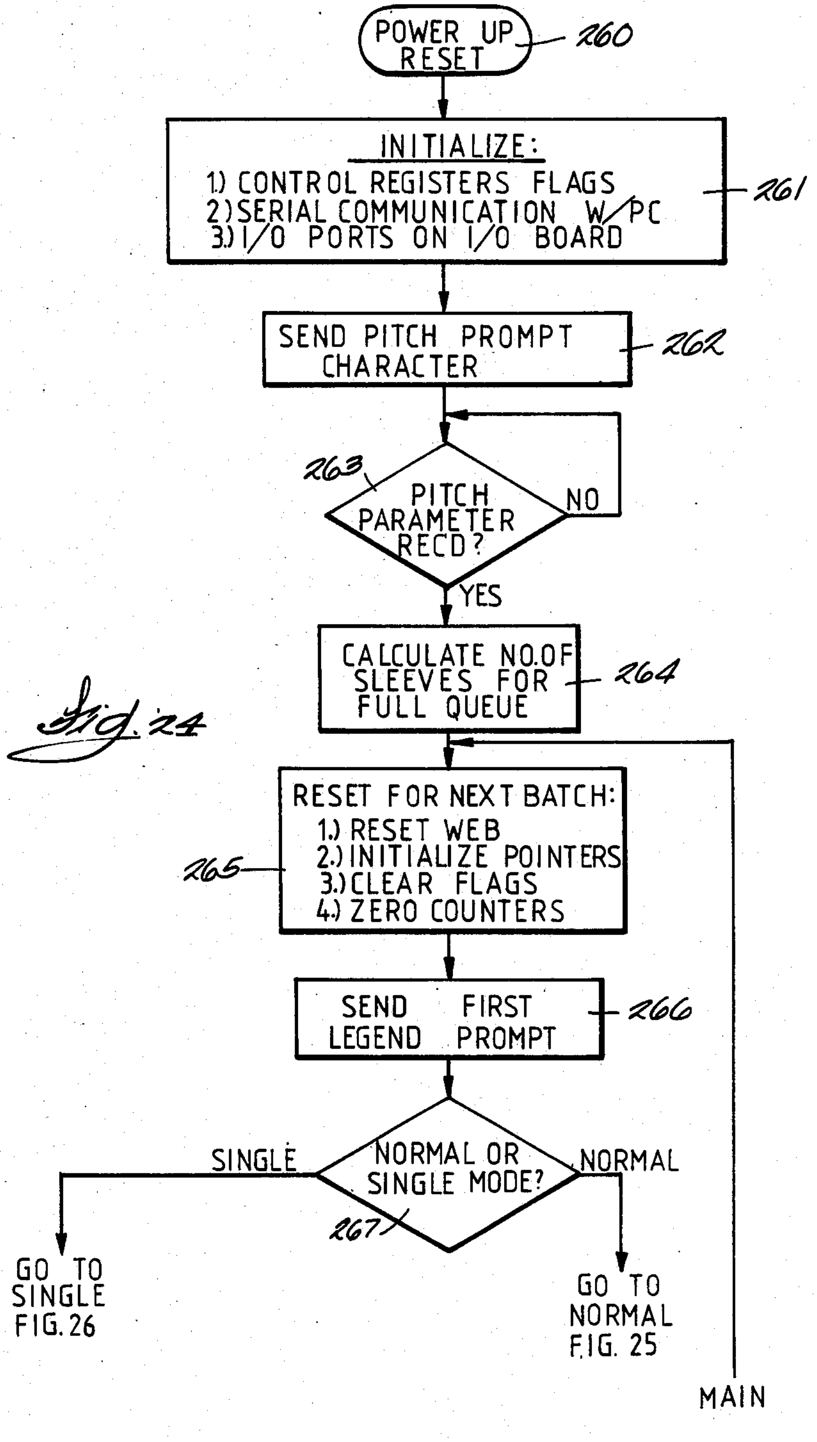
FIGS. 24–26 are flow charts representing the execution of a program by the microcomputer of FIG. 21.

The sequence of printing and sleeve application operations is perhaps best explained as steps in executing the INITIALIZATION ROUTINE and the MAIN LOOP ROUTINE 241 and its associated subroutines seen in FIG. 23. Referring then to FIG. 24, the power reset operation is represented by start block 260. The INITIALIZATION ROUTINE 240 represented in FIG. 24 by process block 261 is executed to clear and set control registers and flag bits to their desired initial values. Certain instructions are executed to ready the SIO 210*a* for communication with the terminal 208. And, the I/O Ports on the peripheral interface circuit 221 are set to operate as inputs or outputs and are set to their initial states.

The MAIN LOOP ROUTINE is then entered to perform certain operations that are performed only once after each reset. Process block 262 represents calling one of the PROMPT SUBROUTINES to send the ">" character to the terminal 208 to prompt the operator to enter a number for the sleeve pitch parameter. As represented by the following decision block 263, the microcomputer 210 then executes an instruction loop while waiting to detect the receipt of the pitch parameter. When the sleeve pitch number is received, it is divided into the queue reference dimension as discussed earlier to determine the number of sleeves required to fill the queue (including one sleeve in the jaws). This is represented by process block 264 in FIG. 24.

The microcomputer 210 then enters the MAIN LOOP portion of the MAIN LOOP ROUTINE. The MAIN LOOP portion is executed repeatedly, in contrast to one-time reset operations discussed above. To start the MAIN LOOP portion, instructions represented by process block 265 are executed to perform functions that are normally done at the conclusion of processing a batch of marker sleeves. After the last sleeve is applied, the web is reset to the printing region by executing the WEB RESET SUBROUTINE discussed earlier herein. Also certain pointers to legend data in the RAM 213 are re-initialized, certain status flags and the end-of-batch flag are cleared and certain counters, including a counter of the number of sleeves in the queue, are zeroed.

Next, as represented by process block 266, the microcomputer 210 sends a prompt character in the form of a "?" character to the communication terminal 208 to signal the operator to enter a legend to be printed on a first marker sleeve. Then it tests two mode status bits (labeled NORMAL and SINGLE in Appendix A) to determine whether the sleeves are to be printed and applied in the NORMAL mode or in the SINGLE mode, respectively. This test is represented by decision block 267. These bits are set in response to escape code commands received over the serial data link from the communication terminal 208. The NORMAL mode is executed in the NORMAL sequence shown in FIG. 25 and the SINGLE mode is executed in the SINGLE sequence in FIG. 26.

Figure 25:
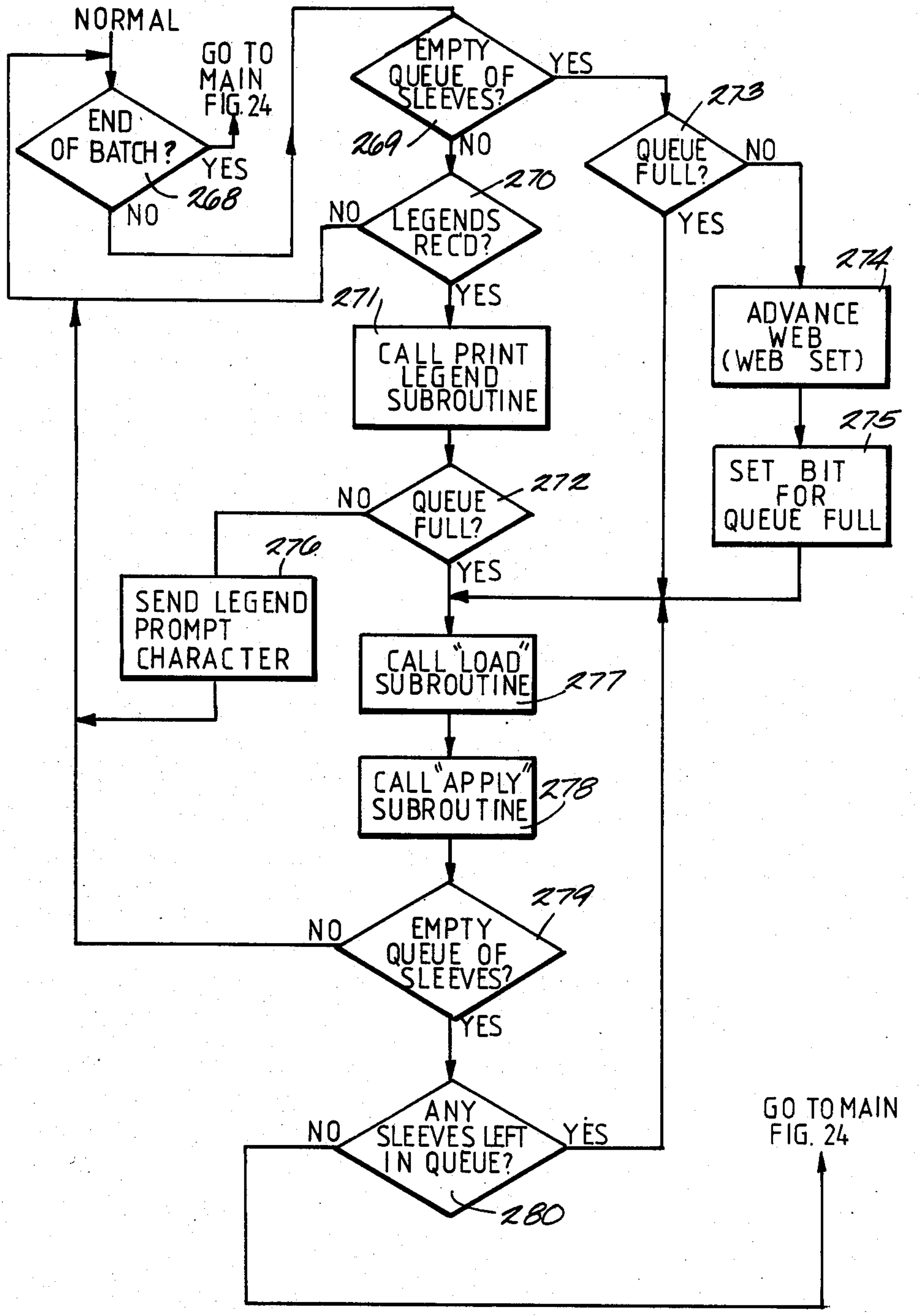

Assuming the NORMAL mode is selected, a check is made for an end-of-batch flag as represented by decision block 268 in FIG. 25. If a check of this bit indicates an end-of-batch condition as represented by the "YES" result, the microcomputer 210 returns to the MAIN entry point in FIG. 24. Assuming the condition is not present, as represented by the "NO" result a "queue dump" flag is checked to see if a special condition exists in which a number of printed sleeves less than a full queue of printed sleeves but greater than one sleeve are to be applied without printing any more sleeves. This can occur near the end of a batch, or where the operator desires to process a batch with a number of sleeves less than the number necessary to fill the queue. If the "queue dump" flag is set, it is signalling that the printed sleeves presently in the queue should be applied, which is represented by the "YES" result branching from decision block 269.

The "queue dump" flag is set in response to an escape code command received over the serial data channel and processed by the ESCAPE CODE PROCESSING SUBROUTINE discussed earlier. This escape command selects the DUMPQ mode of operation. If the "queue dump" condition is indicated, a further check is made as represented by decision block 273 to determine whether the queue is full or less than full. If the queue is full of printed sleeves, the microcomputer 210 proceeds to execute the LOAD SUBROUTINE represented by process block 277 to place the sleeve in the jaws, to close the jaws, to provide the air blast and to advance the pin and knife as discussed earlier. This is the followed by execution of the APPLY SUBROUTINE represented by process block 278 in which a wire is detected when inserted by the operator, the air blast is terminated, the pin and knife are retracted, and, after a suitable time delay, the jaws are opened.

If the queue is not full, as a result of the test in decision block 273, then the WEB SET SUBROUTINE is called to advance the web until an endmost printed marker sleeve is positioned in the open jaws, one vertical tab back from the WEB EYE. A bit is then set in memory to signal that the queue is full, although in this instance not all of the sleeves in the queue have legends printed on them. Then the LOAD SUBROUTINE and the APPLY SUBROUTINE are executed to apply the endmost marker sleeve to a wire inserted between the jaws. The "queue dump" flag is then checked again, as represented by decision block 279, to determine if the queue is being emptied. If this is the case a sleeve counter is checked as represented by decision block 280 to determine whether there are printed sleeves remaining in the queue for application to wires. In a "queue dump" operation, the microcomputer 210 will cycle back through blocks 277–280 until the printed sleeves left in the queue have all been applied.

For printing operations for a batch of sleeves equal to or greater than the number necessary to fill the queue, the "queue dump" condition will not be indicated by the test in decision block 269 as represented by the "NO" result. Then, a check will be made, as represented by decision block 270, to determine whether a new legend has been received for printing. If so, the PRINT LEGEND SUBROUTINE is called, as represented by process block 271, to print the legend on the sleeve in the printing position. Before exiting the PRINT LEGEND SUBROUTINE, the remainder of the first sleeve will be advanced forward to place the next sleeve in the printing position when the queue is not full as a result of printing a legend on the first sleeve. Also upon return to the MAIN loop, a check will be made to see whether the queue is full of printed sleeves, as represented by decision block 272. If the queue is not full, as represented by the "NO" result branch from block 272, the PROMPT SUBROUTINE is executed to send the ":" character to the communication terminal 208. This causes the display of a message to the operator that requests another legend for printing on the next sleeve to enter the printing position. The microcomputer is then directed back to the beginning of the NORMAL sequence until enough sleeves have been printed to fill the queue.

When the queue is full, the test represented by decision block 272 will produce a "YES" result, and the LOAD SUBROUTINE and the APPLY SUBROUTINE are executed to apply the endmost marker sleeve to a wire. The "queue dump" condition is checked in decision block 279 and assuming the result is negative, the microcomputer 210 will return to continue alernating printing operations with sleeve applications. The queue dump condition will be encountered near the end of the batch, and the PRINT function will be bypassed while the last few printed sleeves are applied. The test represented by decision block 280 will then yield a negative result, and the microcomputer 210 will return to the MAIN entry point in FIG. 24.

Figure 26:
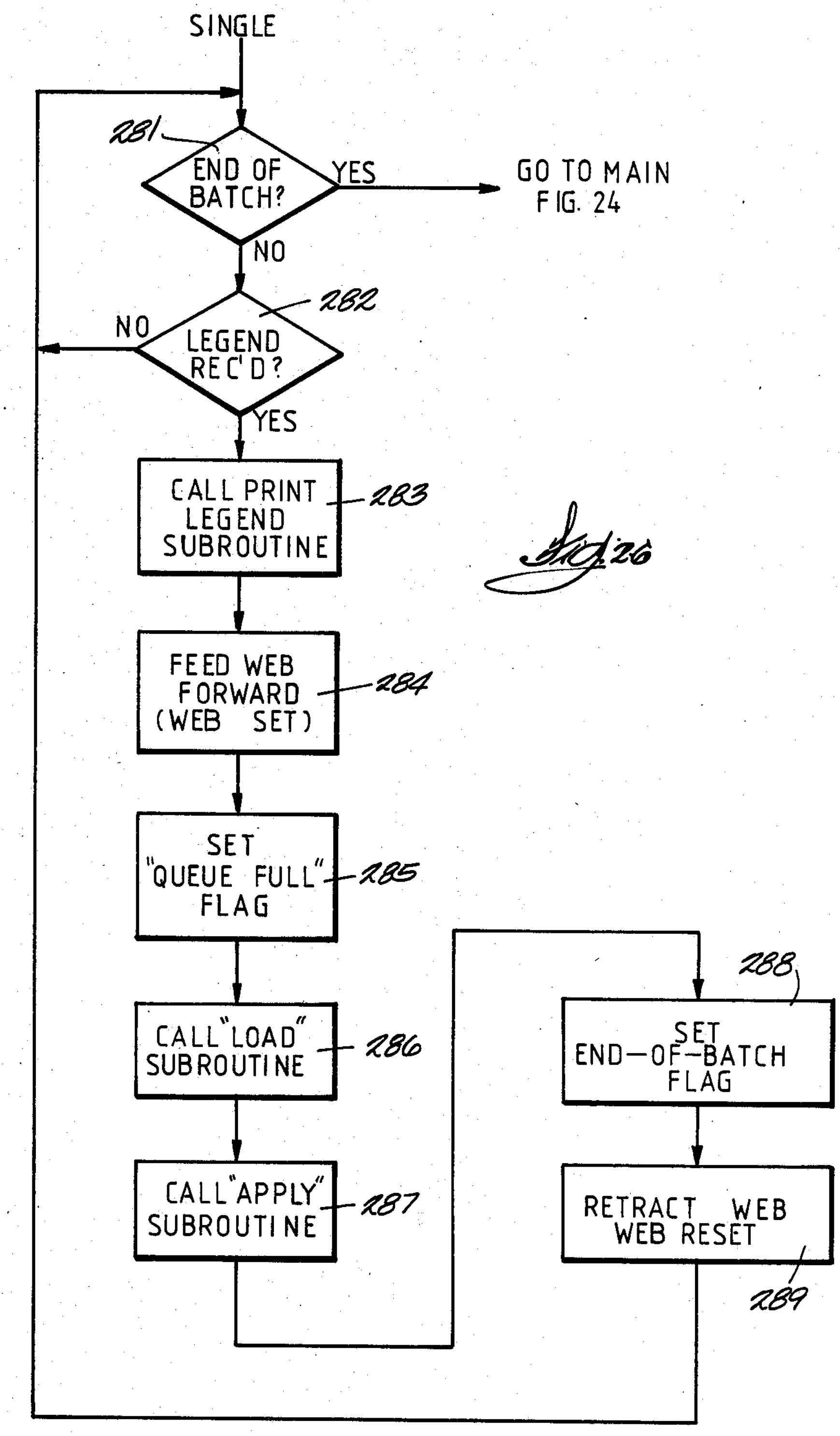

Referring now to FIGS. 24 and 26, when the SINGLE mode is detected as a result of executing the test of decision block 267 in FIG. 24, the microcomputer proceeds to the SINGLE sequence in FIG. 26. As represented by decision block 281, a check is made for an end-of-batch flag. If a check of this bit indicates an end-of-batch condition as represented by the "YES" result, the microcomputer 210 returns to the MAIN entry point in FIG. 24. Assuming the condition is not present, as represented by the "NO" result, a check is made for receipt of a legend to be printed as represented by decision block 282. The execution of the program will then loop through blocks 281 and 282 until a legend is received, as represented by the "YES" result following block 282.

The PRINT LEGEND SUBROUTINE is called, as represented by process block 283, to print the legend on the endmost marker sleeve. This sleeve is located in the printing position during execution of instructions represented by block 265 in FIG. 24. When the WEB RESET SUBROUTINE is executed during initialization, it will first call the WEB SET SUBROUTINE to advance the end of the web to the WEB EYE, before retracting the web to the printing position. Assuming the web is in the printing position after execution of the PRINT LEGEND SUBROUTINE in block 283, the WEB SET SUBROUTINE is again called, as represented by process block 284, to feed the endmost marker sleeve into the open jaws. Next, as represented by process block 285, the "queue full" flag is set, since the queue now contains one printed sleeve in the jaws and six unprinted sleeves between the knife and the printing region. The LOAD SUBROUTINE and the APPLY SUBROUTINE are then executed in succession to apply the printed sleeve to a wire. The end-of-batch flag is then set as represented by process block 288 and the web is retracted by calling the WEB RESET SUBROUTINE as represented by process block 289. This will place the new endmost unprinted marker sleeve in the printing position. The program then directs the microcomputer 210 back to decision block 281 where the end-of-batch condition will be detected to send the microcomputer 210 back to the MAIN entry point in FIG. 24.

To summarize the operation of the machine 20 in the NORMAL, DUMPQ and SINGLE modes, in terms of FIG. 27, if seven or more sleeves are to be applied, the communication terminal 208 will send the escape code command that will request execution of the NORMAL mode, without invoking the DUMPQ mode. When the number of sleeves to be printed and applied is less than seven but more than one, the communication terminal 208 will send the escape code commands that will request execution of the DUMPQ variation of the NORMAL MODE. When only one sleeve is to be printed and applied, the communication terminal 208 will send the escape code command that will request execution of the SINGLE mode.

The REPEAT mode is selected by operating the REPEAT switch 195 and indicated by illumination of the REPEAT LED 196 on the front panel 27. In carrying out the REPEAT mode, the legend from the last sleeve applied to a wire in the jaws is reprinted on the next sleeve to be printed. As following sleeves are printed, the reprinted sleeve is advanced through the queue to the application station 4. When the reprinted sleeve reaches the application station 4, both the REPEAT LED 196 and the APPLY LED 199 are set to flash intermittently. This alerts the machine operator that the reprinted sleeve is now in the jaws. The REPEAT function is completed by applying the reprinted sleeve and resetting the machine for normal operation, the resetting being done automatically when the sleeve is applied. The REPEAT MODE thereby allows an operator to reproduce a printed sleeve that was not satisfactorily printed or was damaged, for example, while retaining normal operation with respect to processing other sleeves.

The REPEAT mode is carried out by executing certain additional instructions in the 10-MILLISECOND INTERRUPT ROUTINE 243, the PRINT LEGEND SUBROUTINE 245 and the APPLY SUBROUTINE 247. The operation of the REPEAT switch 195 is sensed by executing the input/output instructions mentioned previously in connection with the 10-MILLISECOND INTERRUPT ROUTINE 243. However, operation of the REPEAT switch will not invoke the REPEAT mode, due to execution of certain flag check instructions, if flag bits have previously been set to select either the DUMPQ mode or the SINGLE mode. Thus, the REPEAT mode can only be executed as a variation of the NORMAL mode, and not as a variation of the DUMPQ mode or the SINGLE mode.

The legends to be printed on the sleeves are stored in the RAM 213 in FIG. 21. The legend storage area stores the legend for the sleeve just applied, the legends for the other sleeves in the queue, and the legend for the next unprinted sleeve to be positioned in the printing position. As applied to the example in FIG. 27, this would include nine legends. Pointer registers are set up in the internal RAM 210c to store the address of the first legend in a series of nine legends received from the communication terminal and the last legend in this series.

When executing the REPEAT operation, instructions in the PRINT LEGEND SUBROUTINE are executed to switch a pointer to select the first legend—the legend of the sleeve just applied—as the next legend to be printed, rather than the ninth legend, which is the legend most recently received from the communication terminal 208. Other instructions in the PRINT LEGEND SUBROUTINE are executed to set up a counter to count each time the reprinted sleeve is moved one sleeve width closer to the application station 4. When executing the APPLY SUBROUTINE, additional instructions are executed to compare the accumulated count with the number of sleeves needed to fill the queue. When the numbers match, the reprinted sleeve has reached and been loaded into the jaws. On detecting this event, other instructions in the APPLY SUBROUTINE are executed to flash the REPEAT LED 196 and the APPLY LED 199. After detecting insertion of a wire, and performing the other application functions through the opening of the jaws, further instructions in the APPLY routine are executed to turn off the REPEAT LED 196 and the APPLY LED 199. During the REPEAT operation, a flag bit is set to prevent the sending of one prompt character to the communication terminal 208. This prevents receipt of an extra legend, since one legend has now been used twice.

This concludes this part of the description concerning the programming and operations of the 8031 microcomputer 210. For those skilled in the art, further information is provided in Appendix A.

There has thus been described a new marker sleeve processing machine including feed means for advancing a series of marker sleeves along a feed path past a printing station and then to a sleeve receiving station; means for designating a character or preferably a group of characters, forming a legend to be printed on the sleeve, illustrated above as a communication terminal such as a personal computer or other input means; memory means storing a program for (a) reading the designated character, (b) directing printing of the designated character, (c) causing the feed means to advance the printed sleeve to the receiving station and (d) directing removal of the printed sleeve from the series of sleeves, illustrated above as PROM and RAM memories; and digital processing means for controlling the printing, feeding and removal of marker sleeves in response to the program in the memory means, illustrated above as a microcomputer including a CPU and its associated operating elements and circuits.

The new machine of this invention is the first to provide an end user with an apparatus integrating in a single machine the processing of marker sleeves including printing, advancement and severance of printed sleeves for removal from the machine. This provides the end user with a machine allowing the processing of blank marker sleeves into identification devices bearing the user's selected identification indicia, thereby giving a user full control of the identification operation and maximum flexibility in its execution. A machine constructed and tested during development of this invention was demonstrated to be capable of high speed processing of a blank web of marker sleeves to printed individual sleeves; for example, a machine of this invention has been found capable of processing sleeves in a cycle time as short as in the range of 1.5 to 3 seconds, including printing a sleeve and processing it for removal from the machine.

The invention shows unique skill in the resolution of the technical problems first discussed in the foregoing description. For example, a machine of this invention includes a microcomputer which can communicate with both an electronic printer and a sophisticated user interface, and thereby direct printing of legends on marker sleeves. Registration of an endmost marker sleeve with a print means is achieved by feeding a series of marker sleeves along a feed path until the arrival of the endmost sleeve is sensed by a sensor at the sleeve receiving station. The marker sleeves are then fed in a reverse direction to the print means—over what is referred to as a "queue" length or distance. In addition, the invention allows a "pitch" parameter for one of several possible sizes of marker sleeves to be entered through the user interface. The microcomputer responds to the pitch parameter to redetermine the number of sleeves that will fill the queue, and if any fine adjustment is required in positioning the print means, a manual positioning means can be provided to reposition the print means relative to the sleeve receiving station.

Also, an apparatus of the invention can be provided with several different modes of coordinating the operation of the printing station and the sleeve receiving station. A first mode allows the user to print and process a number of sleeves equal to or greater than the number needed to fill the distance from the printing station to the sleeve receiving station, by printing the sleeves in sequence until the endmost sleeve reaches the sleeve receiving station in the course of the printing operation. At that point one sleeve will be severed from the web and a next sleeve at the printing station will be printed and added to the number of printed sleeves waiting for further processing at the sleeve receiving station.

As a second mode, an apparatus of the invention also can allow the user to print and process fewer than the number of sleeves needed to fill the distance from the printing station to the sleeve receiving station. After the requested number of sleeves has been printed, the web is advanced to fill the remainder of the distance between the two stations with unprinted sleeves. The apparatus then keeps track of the number of printed sleeves, so that only the printed sleeves are processed by the sleeve receiving station. After such processing, the web can be retracted to the printing station, where it will begin the handling of the next batch of sleeves.

A third mode of operation that can be incorporated in the apparatus gives the user the ability to reproduce a printed sleeve that has not been satisfactorily printed or otherwise processed. The apparatus can be adapted to allow the user to repeat the printing of the legend on the sleeve that was last handled at the sleeve receiving station. The apparatus will keep track of the reprinted sleeve until it is advanced to the sleeve receiving station and then signal the user that the reprinted sleeve is in position in the sleeve receiving station, so that it can be applied to an article or processed in some other way.

It can be seen that an apparatus according to this invention can be provided in embodiments other than those specifically described hereinabove. The foregoing description, including the details of construction illustrated in the drawings, is illustrative of the principles of this invention, and numerous modifications and changes will readily occur to those skilled in the art. It is to be understood that it is intended that the appended claims shall encompass all changes and modifications of the embodiments of this invention herein described and other embodiments not shown which do not constitute a departure from the true spirit and scope of this invention.

We claim:

1. Apparatus for processing a series of open-ended marker sleeves fed along a feed path comprising, in combination:

a printing station including print means adjacent the feed path for printing at least one character on a marker sleeve that is moved into a printing position adjacent the print means;

a sleeve removal station for removing a printed marker sleeve from the series of marker sleeves;

feed means for feeding a marker sleeve into the printing position, and later, for feeding a printed marker sleeve from the printing position to the sleeve removal station;

means for designating the character to be printed on a marker sleeve;

memory means for storing a program of instructions for reading the designated character, for controlling the feed means to feed the marker sleeve into the printing position, for directing the print means to print the designated character on the marker sleeve, and for controlling the feed means to move the printed marker sleeve to the sleeve removal station where the printed marker sleeve can be removed from the series of marker sleeves; and digital processing means interfaced to the feed means, to the print means and to the sleeve removal station and responsive to the program of instructions in the memory means for (i) controlling the feed means to move a marker sleeve into the printing position, (ii) for controlling the print means to print the designated character on the marker sleeve, and (iii) for controlling the feed means to move the printed marker sleeve to the sleeve removed station where the printed marker sleeve can be removed from the series of marker sleeves according to the program of instructions in the memory means.

2. Apparatus for processing a marker sleeve from a series of open-ended marker sleeves fed along a feed path, the apparatus comprising:

a printing station including print means adjacent the feed path for printing at least one character on a marker sleeve that is moved into a printing position adjacent the print means;

a sleeve receiving station located downstream of the printing position to define a distance therebetween;

sensor means located at the sleeve receiving station and responsive to detecting an endmost marker sleeve of the series of marker sleeves for generating a sleeve present signal;

feed means for advancing the series of marker sleeves in a forward direction from the printing position to the sleeve receiving station and in a reverse direction from the sleeve receiving station to the printing position; and controlling means for directing the feed means, said controlling means initially directing the feed means to operate in the forward direction, and said controlling means being coupled for receiving the sleeve present signal from the sensor means and thereafter directing the feed means to operate in the reverse direction to retract the endmost marker sleeve over the distance between the sleeve receiving station and the printing position to position the endmost marker sleeve in the printing position.

3. The apparatus of claim 2, further comprising:

manual positioning means for securing the print means in a selected one of a plurality of positions that are spaced by less than one sleeve width along the feed path to enable minor adjustments in the location of the printing position.

4. The apparatus of claim 2, further comprising:

input means for entering a sleeve width parameter; and wherein the controlling means is coupled to the input means to receive the sleeve width parameter, and is responsive to such parameter to retract endmost marker sleeves of varying widths over the distance to the printing position.

5. Apparatus for processing a first marker sleeve before processing a second marker sleeve from a series of open-ended marker sleeves fed along a feed path, the apparatus comprising:

a printing station including print means adjacent the feed path for printing at least one character on a first marker sleeve that is moved into a printing position adjacent the print means;

a sleeve receiving station located downstream of the print means for receiving a printed marker sleeve;

sensor means located at the sleeve receiving station and responsive to detection of the presence of the first marker sleeve for generating a sleeve present signal;

feed means for advancing the marker sleeves in a forward direction from the print means to the sleeve receiving station and for retracting the web in a reverse direction from the sleeve receiving station to the print means;

first controlling means coupled for directing the print means to print a legend of at least one character on the first marker sleeve;

second controlling means coupled to the sensor means and to the feed means and responsive to the printing of the legend on the first marker sleeve for causing the feed means to advance the printed first marker sleeve in the forward direction until a sleeve present signal is received indicating presence of the printed first marker sleeve at the sleeve receiving station;

third controlling means coupled to the sleeve receiving station and responsive to the advance of the printed first marker sleeve thereto for directing removal of the printed first marker sleeve from the apparatus; and fourth controlling means coupled to the feed means and responsive to removal of the printed first marker sleeve from the apparatus for causing the feed means to retract the second marker sleeve in the reverse direction to position it in the printing position.

6. Apparatus for processing a plurality of marker sleeves from a series of open-ended marker sleeves fed along a feed path before removing an endmost marker sleeve from the series, the apparatus comprising:

a printing station including print means adjacent the feed path for printing a legend of at least one character on a marker sleeve that is moved into a printing position adjacent the print means;

a sleeve receiving station for removing a printed marker sleeve from the series, the sleeve receiving station being located downstream of the printing position to define a distance therebetween;

sensor means located at the sleeve receiving station and responsive to detection of the endmost marker sleeve of the series for generating a sleeve present signal;

feed means for feeding the series of marker sleeves from the printing position to the sleeve receiving station;

first controlling means coupled to the print means for causing the print means to print a legend of at least one character on the endmost marker sleeve;

second controlling means responsive to the printing of the legend on the endmost marker sleeve for causing the feed means to advance a next sleeve into the printing position while advancing the printed endmost marker sleeve towards the sleeve receiving station; and third controlling means coupled to the feed means and to the print means for alternating the printing of legends on the next sleeve and following sleeves with the advancing of the series to move a plurality of printed marker sleeves into the distance between the printing position and the sleeve receiving station.

7. The apparatus of claim 6, wherein the third controlling means fills the distance between the printing position and the sleeve receiving station with printed marker sleeves.

8. The apparatus of claim 6, further comprising:

fourth controlling means coupled to the feed means and responsive to a signal to empty the printed sleeves from the apparatus for causing the feed means to advance to fill the remainder of the distance between the printing position and the sleeve receiving station with unprinted marker sleeves; and fifth controlling means coupled to the sleeve receiving station and coupled to the feed means for alternately removing the endmost printed sleeve and causing the feed means to advance the next printed sleeve to the sleeve receiving station until all of the printed sleeves have been removed from the series.

9. Apparatus for processing marker sleeves from a series of open-ended marker sleeves fed along a feed path, the apparatus comprising:

a printing station including print means adjacent the feed path for printing at least one character on a marker sleeve that is moved into a printing position adjacent the print means;

an applicator station where an article can be inserted into an open end of a printed marker sleeve;

feed means for moving a marker sleeve into the printing position, and later, for moving a printed marker sleeve from the printing station to the applicator station;

means for designating the character to be printed on a marker sleeve;

means for reading the designated character;

means for directing the print means to print the designated character on a marker sleeve;

first feed controlling means for controlling the feed means to move a marker sleeve into the printing position;

second feed controlling means responsive to the printing of the character on a marker sleeve for controlling the feed means to move the printed marker sleeve from the printing position to the applicator station; and means responsive to the movement of the printed marker sleeve to the applicator station for controlling the applicator station to enable insertion of the article into an open end of the printed marker sleeve.

10. The apparatus of claim 9, further comprising:

means for designating two different sleeve widths that are applicable to two respective series of marker sleeves; and wherein the feed controlling means is responsive to the means for designating the two different sleeve widths for controlling the movement of sleeves of different sleeve widths in the two respective series into registration with the printing position.

* * * * *